(12) United States Patent
Schröder

(10) Patent No.: US 6,360,061 B1
(45) Date of Patent: Mar. 19, 2002

(54) CAMERA WITH A DEVICE FOR LOCKING THE FILM FEED

(75) Inventor: Rolf Schröder, Zorneding (DE)

(73) Assignee: Agfa-Gevaert N.V. (BE)

( * ) Notice: Subject to any disclaimer, the term of this patent is extended or adjusted under 35 U.S.C. 154(b) by 0 days.

(21) Appl. No.: 09/481,983

(22) Filed: Jan. 12, 2000

(30) Foreign Application Priority Data

Jan. 16, 1999 (DE) .......................................... 199 01 578

(51) Int. Cl.⁷ ................................................ G03B 1/00
(52) U.S. Cl. ........................ 396/396; 396/411; 396/443
(58) Field of Search ................................ 396/395, 396, 396/401, 411, 443

(56) References Cited

U.S. PATENT DOCUMENTS 4,710,006 A * 12/1987 Wong .......................... 396/396
5,899,590 A *  5/1999 Schroder et al. ............. 396/395
5,991,552 A * 11/1999 Balling et al. ............... 396/395

\* cited by examiner

Primary Examiner—Alan A. Mathews
(74) Attorney, Agent, or Firm—Connolly Bove Lodge & Hutz LLP

(57) ABSTRACT

A camera comprises a film feed device (9) for feeding a light-sensitive film arranged in the camera, a shutter release device (300) for releasing a photographic shutter (10) of the camera for the image-forming exposure of the film, and a feed locking device (200) which under the action of a spring reservoir (208) can be converted depending on the film forward feed by in each case one frame into a locking position that locks the film feed device (9) and can be converted depending on the actuation of the shutter release device (300) into a release position that unlocks the film feed device (9), whereby the spring reservoir (208) is detensioned when the feed locking device (200) is in the locking position and when it is converted into the release position, and the spring reservoir (208) is increasingly tensioned by a control device (104, 106) that moves on feeding the film, during the film feed by the length of one frame that in each case follows a release of the shutter. Preferably the spring reservoir (208) of the feed locking device (200) receives a maximum tensioning by the control device (104, 106) shortly before the film feed has completed a full frame and the feed locking device (200) adopts its locking position.

22 Claims, 22 Drawing Sheets

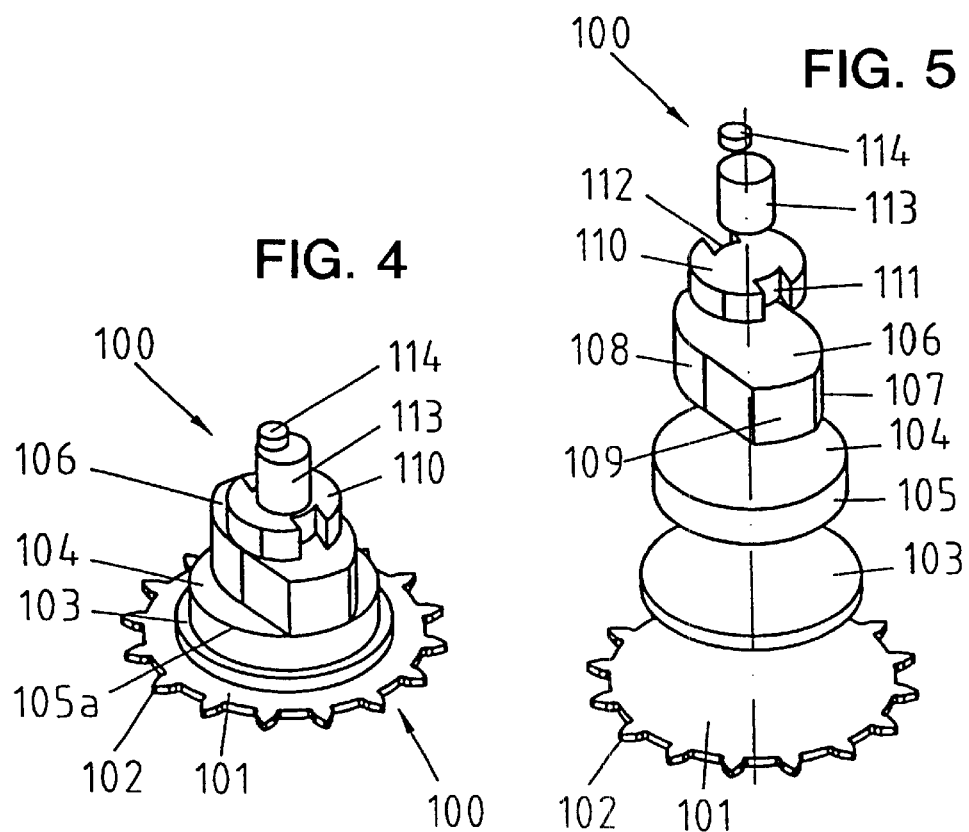
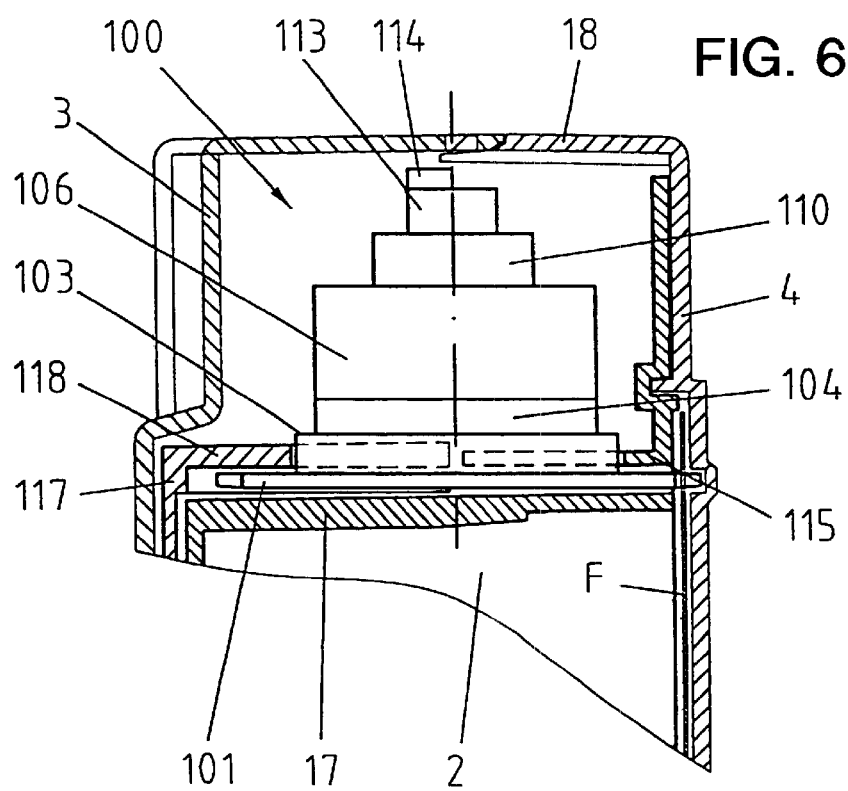

CAMERA WITH A DEVICE FOR LOCKING THE FILM FEED

The present invention relates to a camera with a film feed device for feeding a light-sensitive film arranged in the camera, with a device for releasing a photographic shutter of the camera for the image-forming exposure of the film and with a device for locking the film feed device according to the pre-characterising part of claim 1.

In known cameras of this type, a spring reservoir of the feed locking device is tensioned when the said feed locking device is in a functional state that locks the film feed or in a functional state that releases the film feed. Generally the spring reservoir in each of these two functional states is more or less tensioned. Since the camera is often kept in one of these two functional states by the user for relatively long periods of time without being used from time to time, this means that the spring reservoir of the feed locking device remains tensioned over correspondingly long periods of time. There is therefore the danger that the spring reservoir will become fatigued and give rise to malfunctions during later use of the camera, particularly if this spring reservoir is to be manufactured of elastic plastics material in order to reduce manufacturing costs, since undesired cold flow processes can take place in such material.

The object of the invention is to provide a camera of the type mentioned at the beginning in which there is no longer any danger of a fatigue or deterioration of a spring reservoir of the feed locking device even when the camera is kept for relatively long periods of time in one of the aforementioned functional states.

According to the invention this object is achieved by the characterising features of claim 1.

Further developments of the invention are disclosed in the subclaims.

Figure 1:
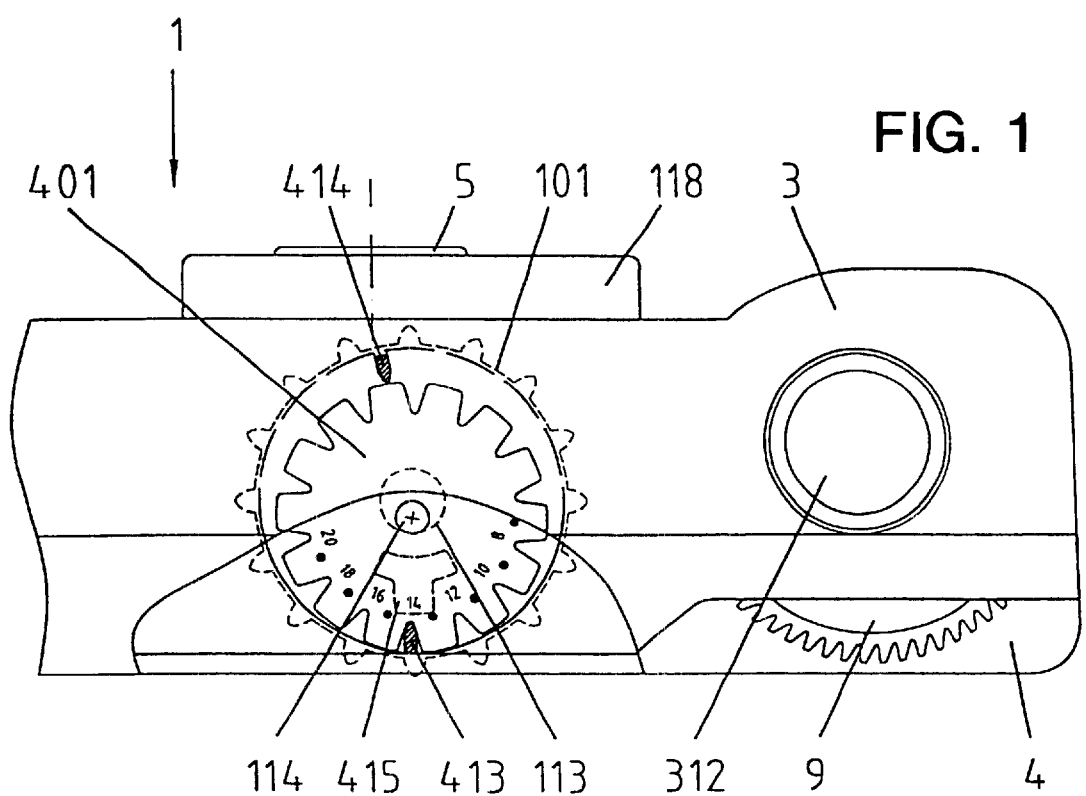
Figure 2:
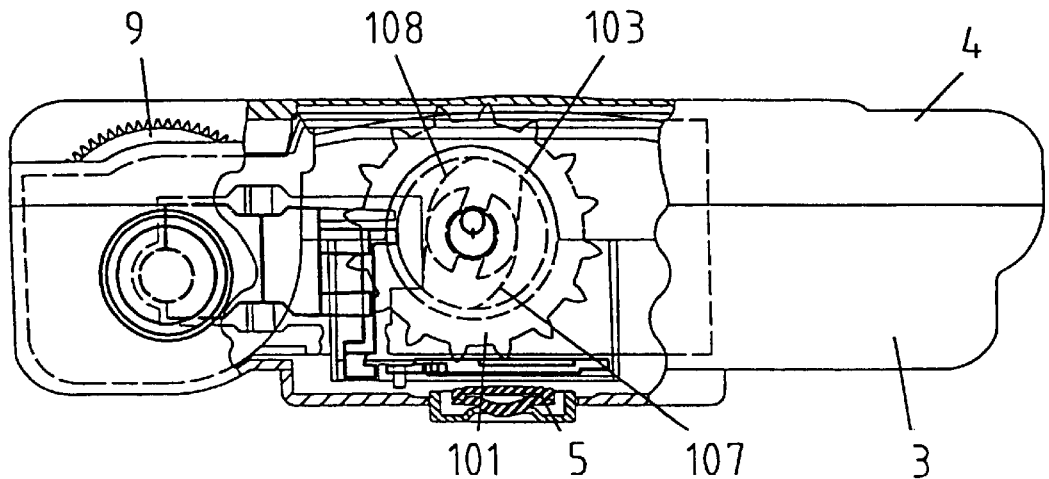
Figure 3:
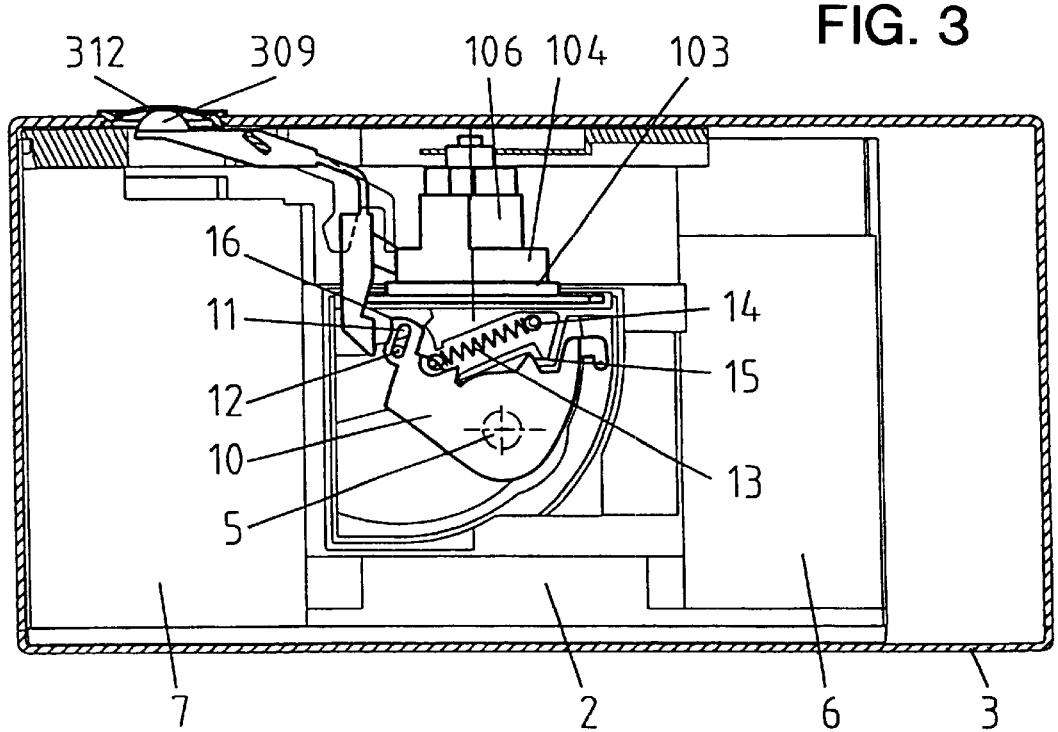
Figure 7:
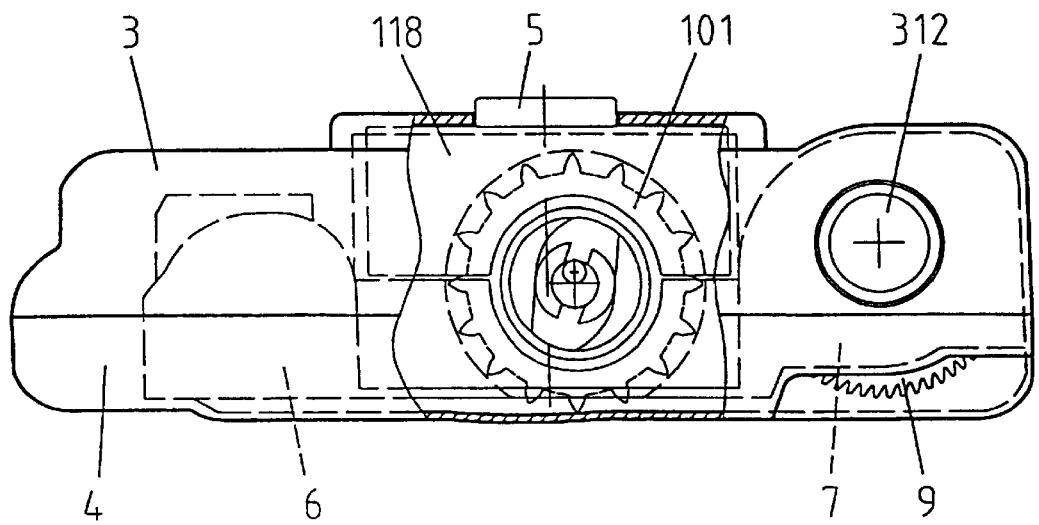
Figure 8:
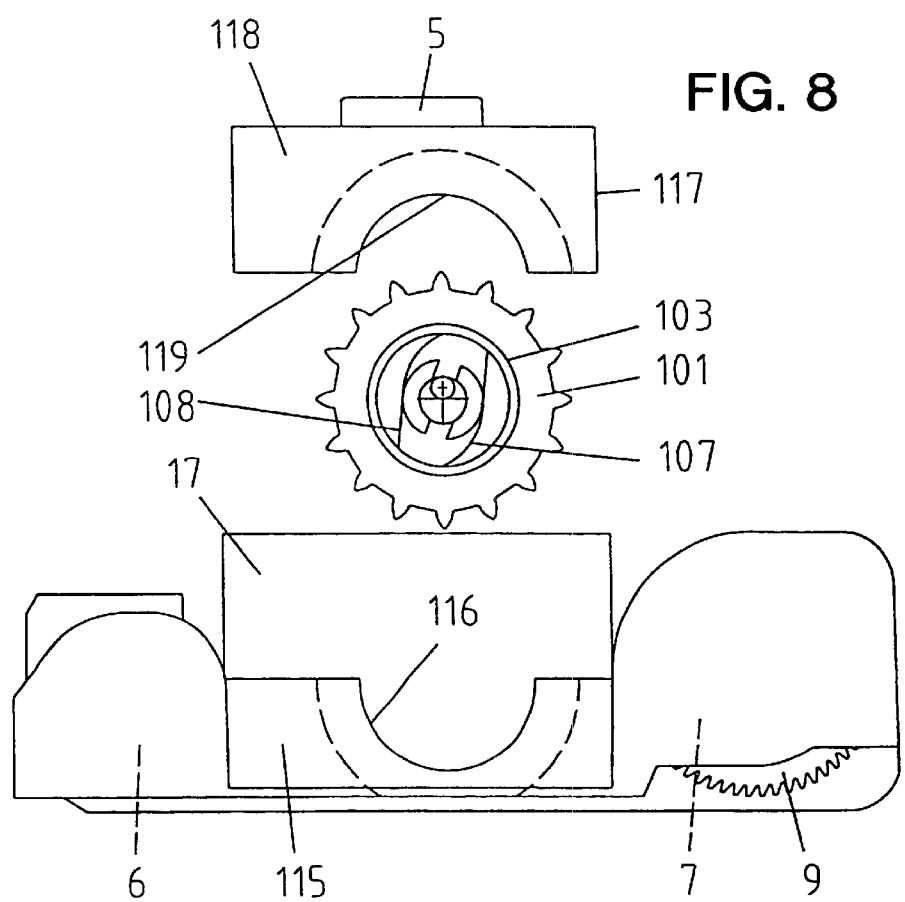
Figure 9:
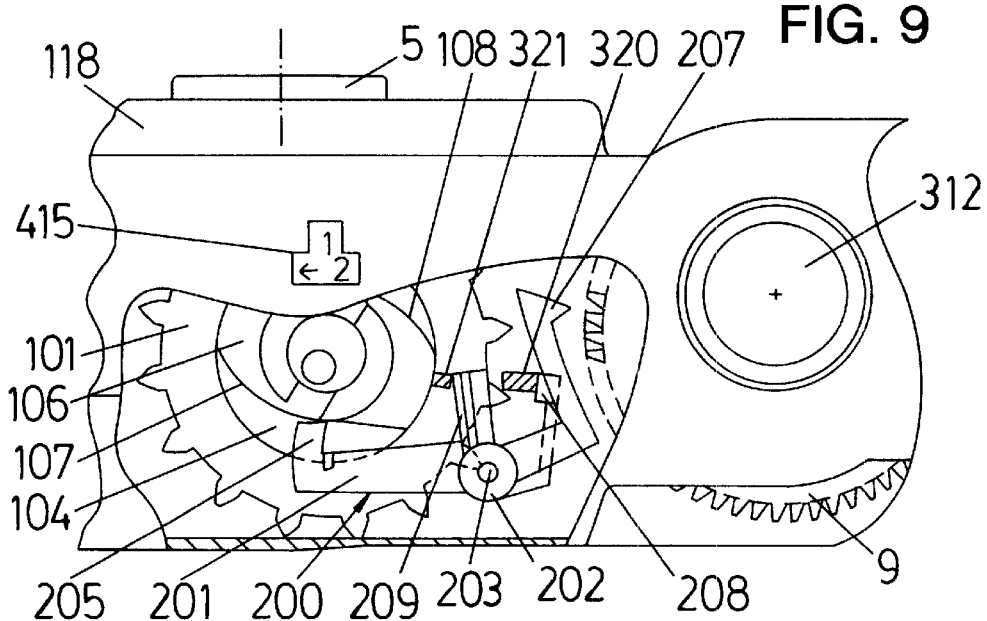
Figure 10:
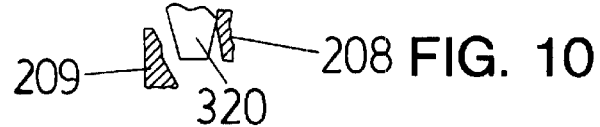
Figure 11:
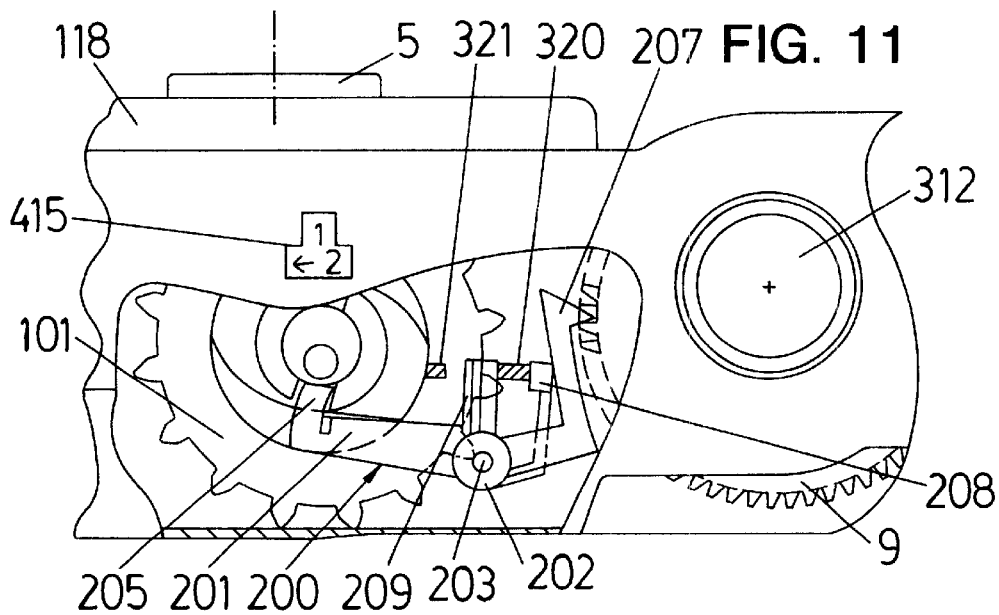
Figure 12:
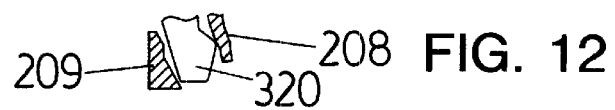
Figure 13:
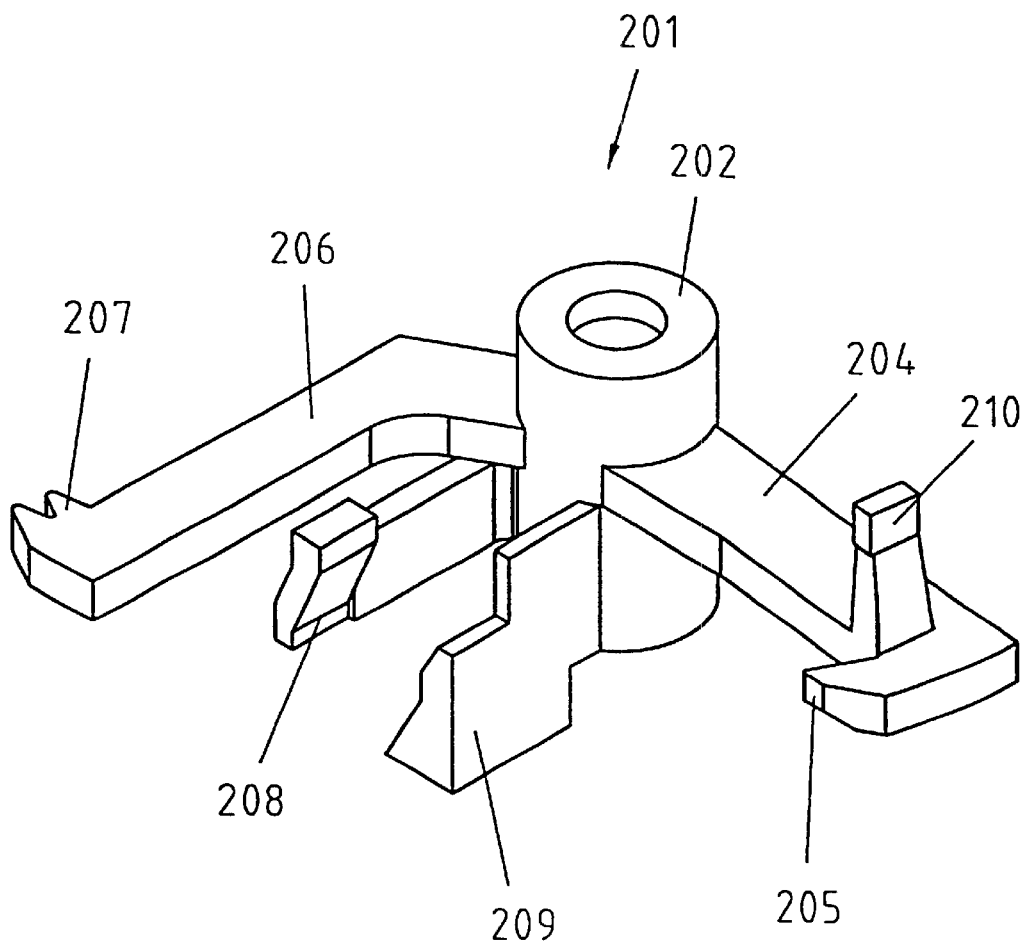
Figure 14:
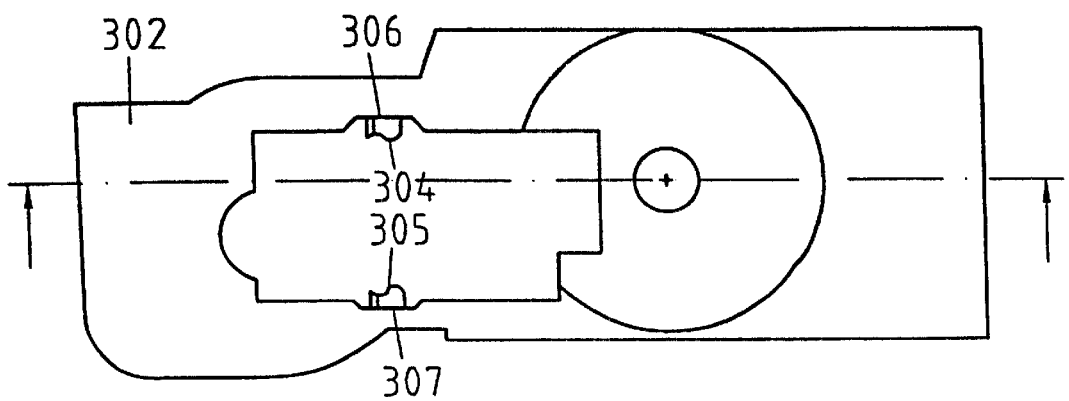
Figure 15:
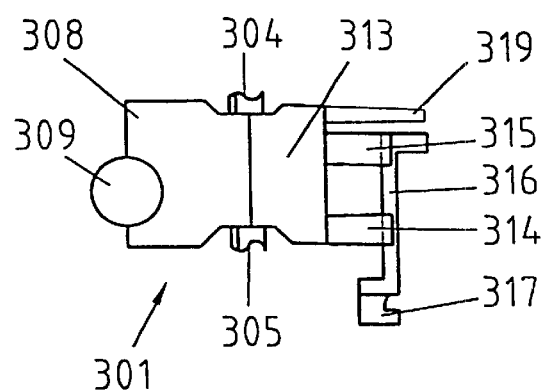
Figure 16:
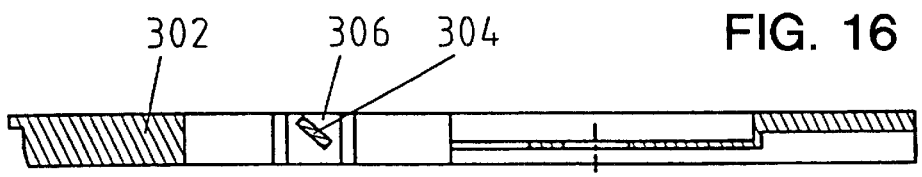
Figure 17:
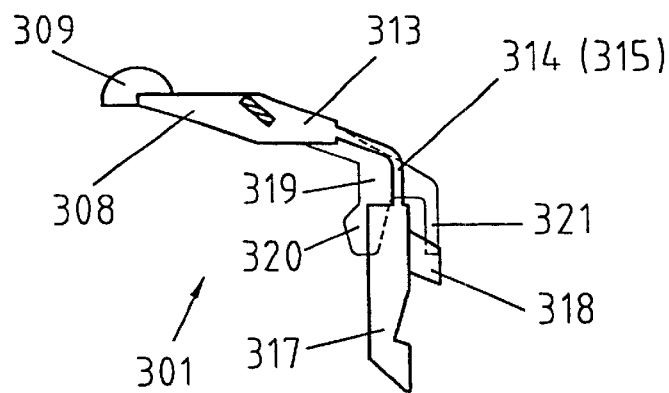
Figure 18:
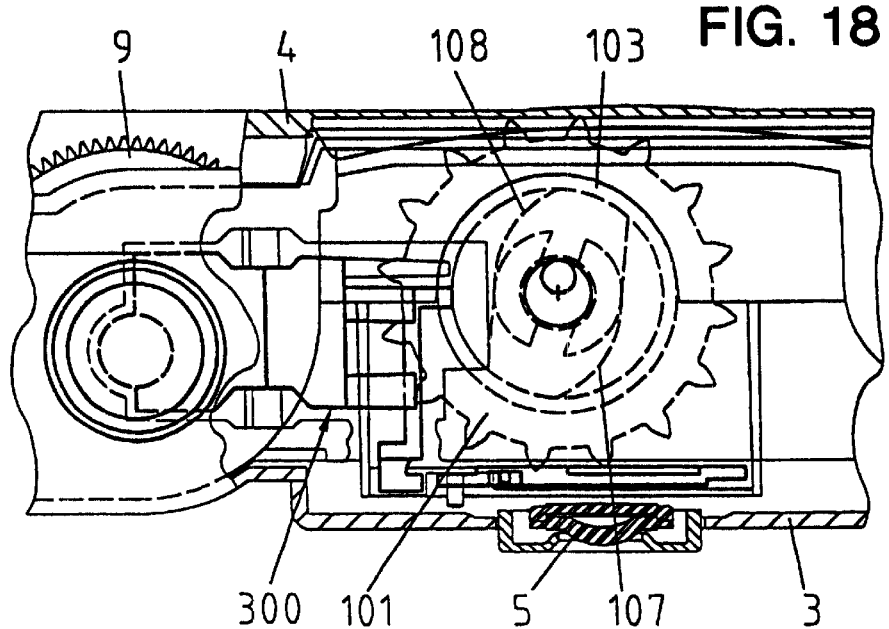
Figure 19:
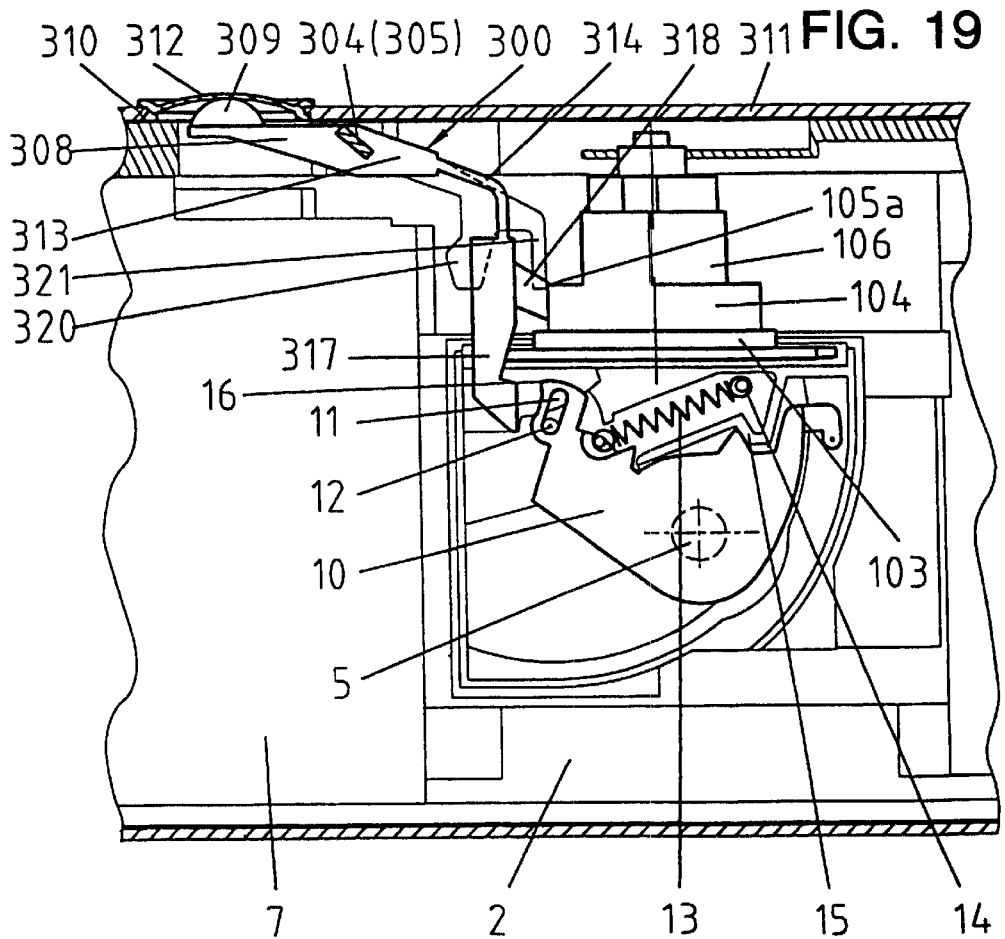
Figure 20:
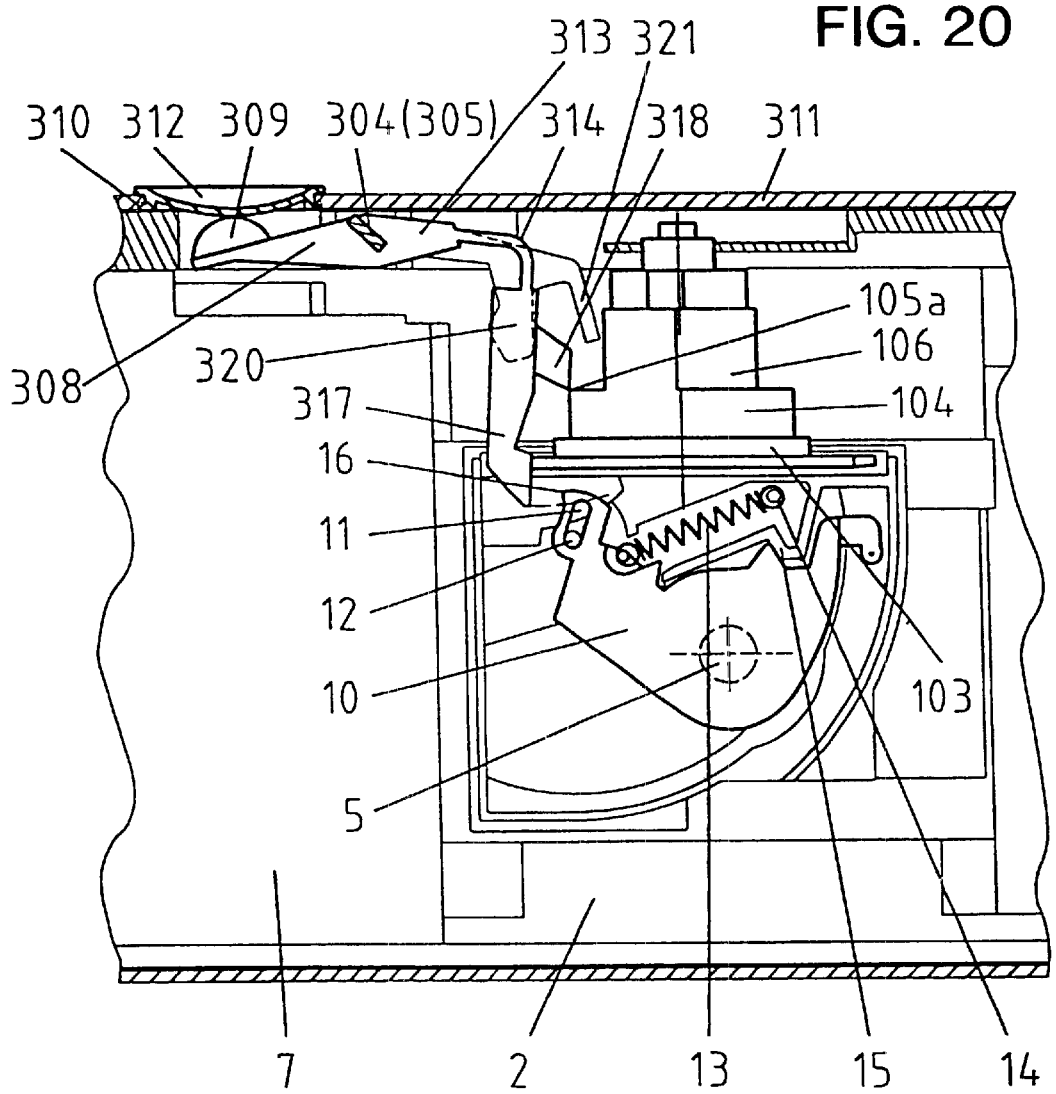
Figure 21:
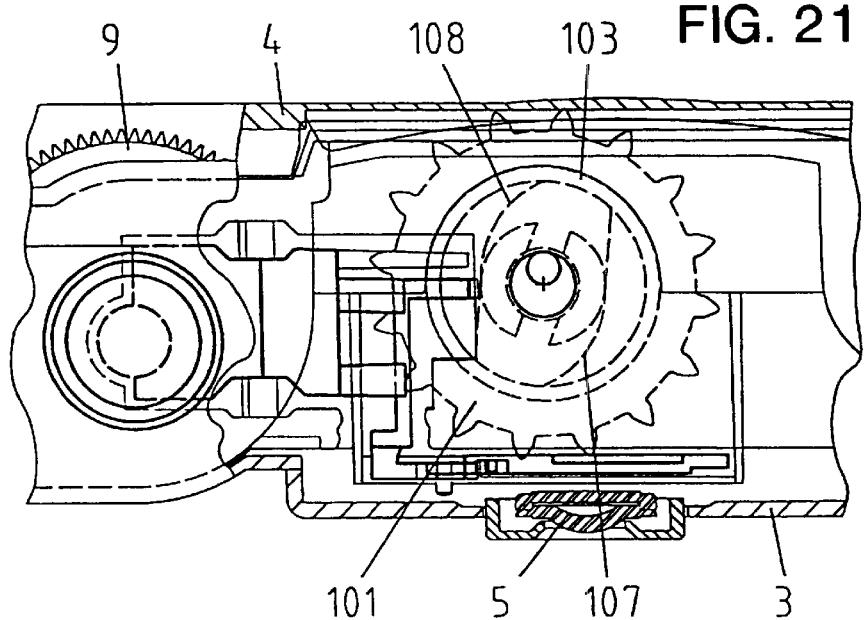
Figure 22:
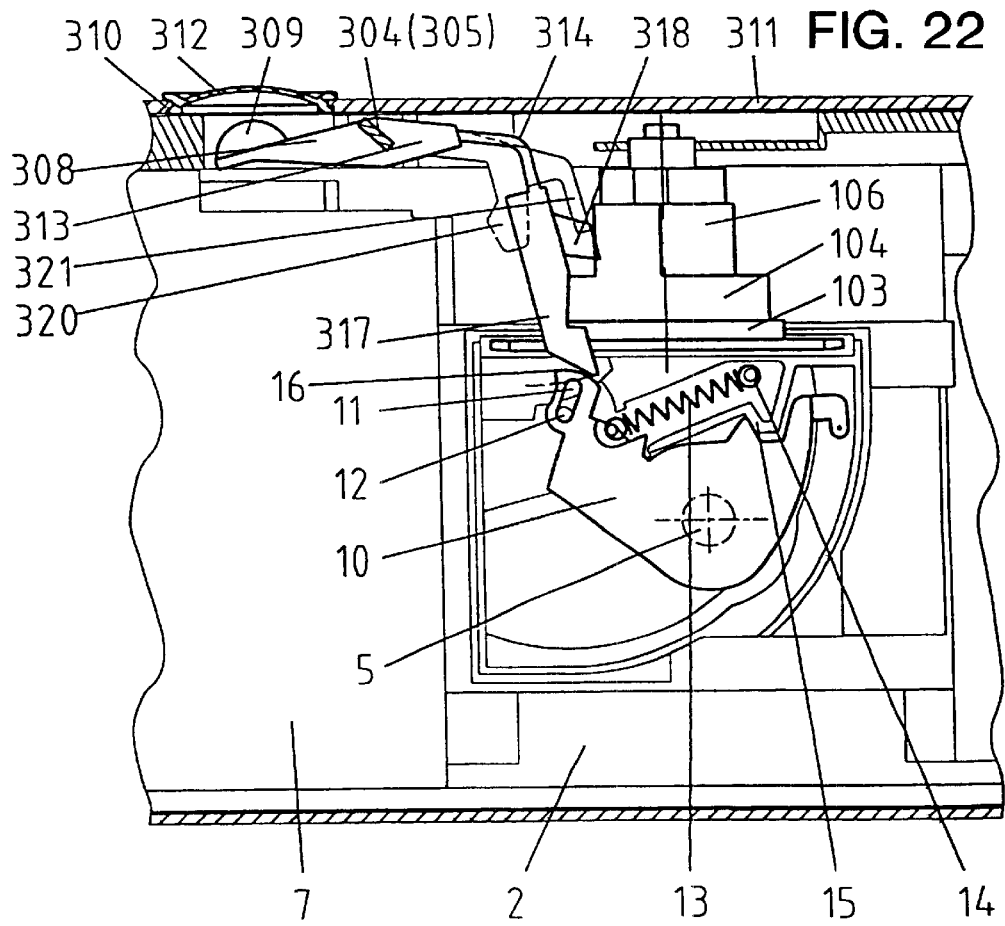
Figure 23:
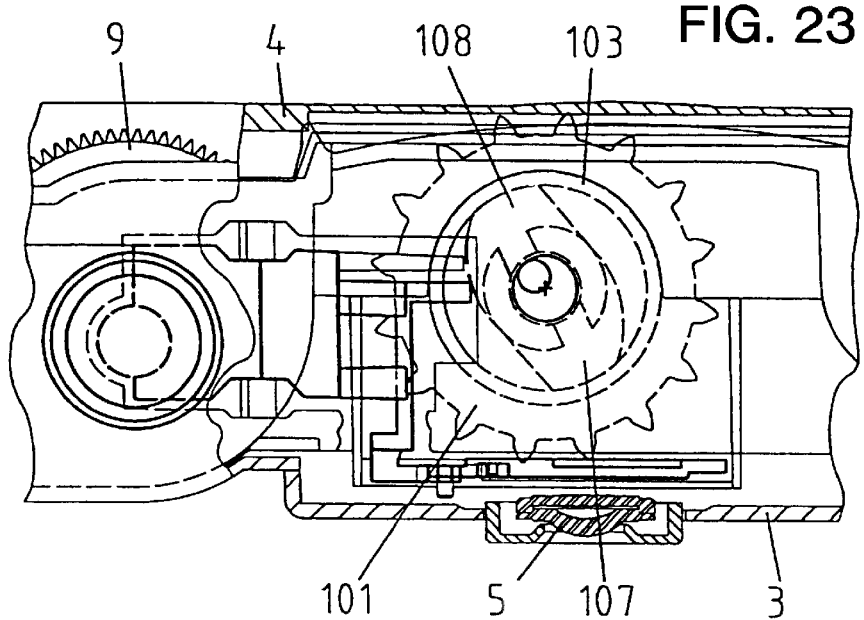
Figure 24:
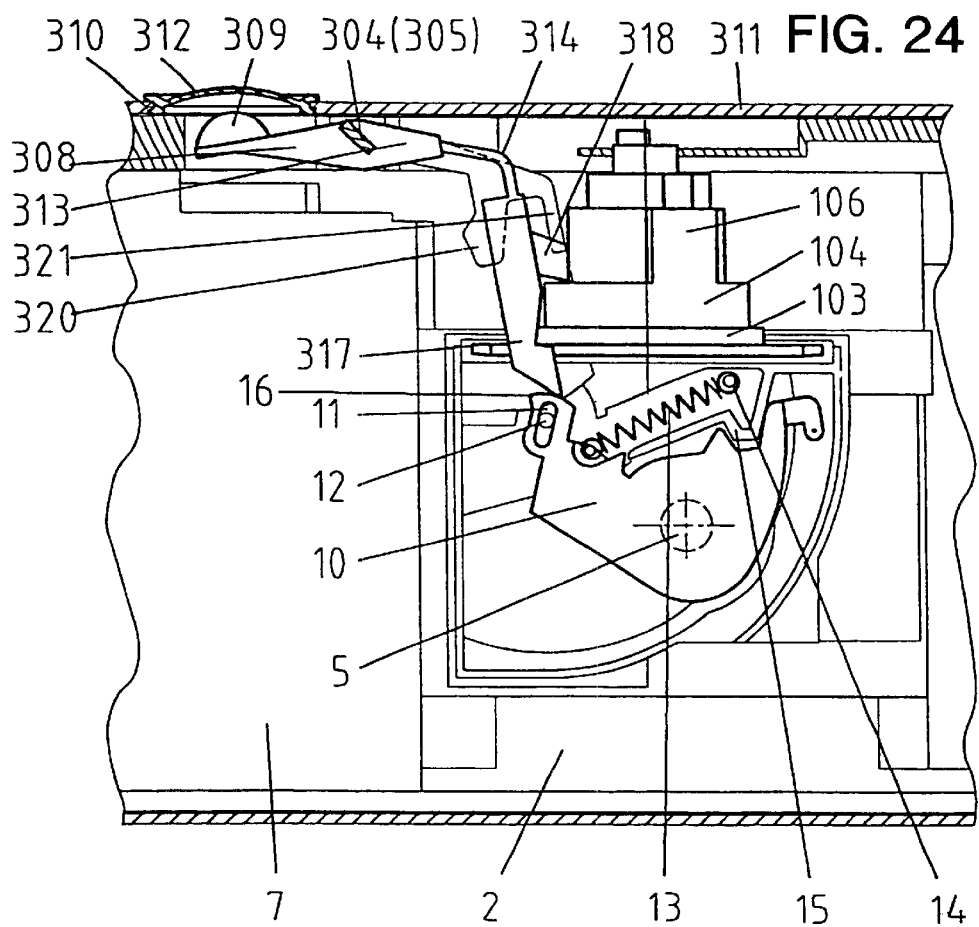
Figure 25:
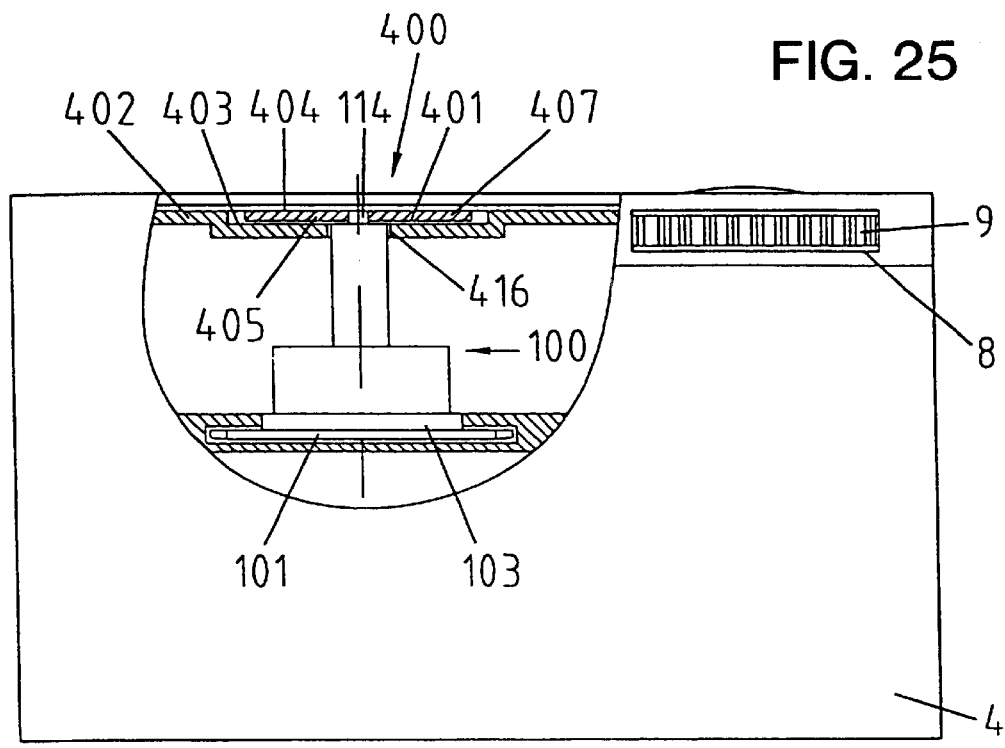
Figure 26:
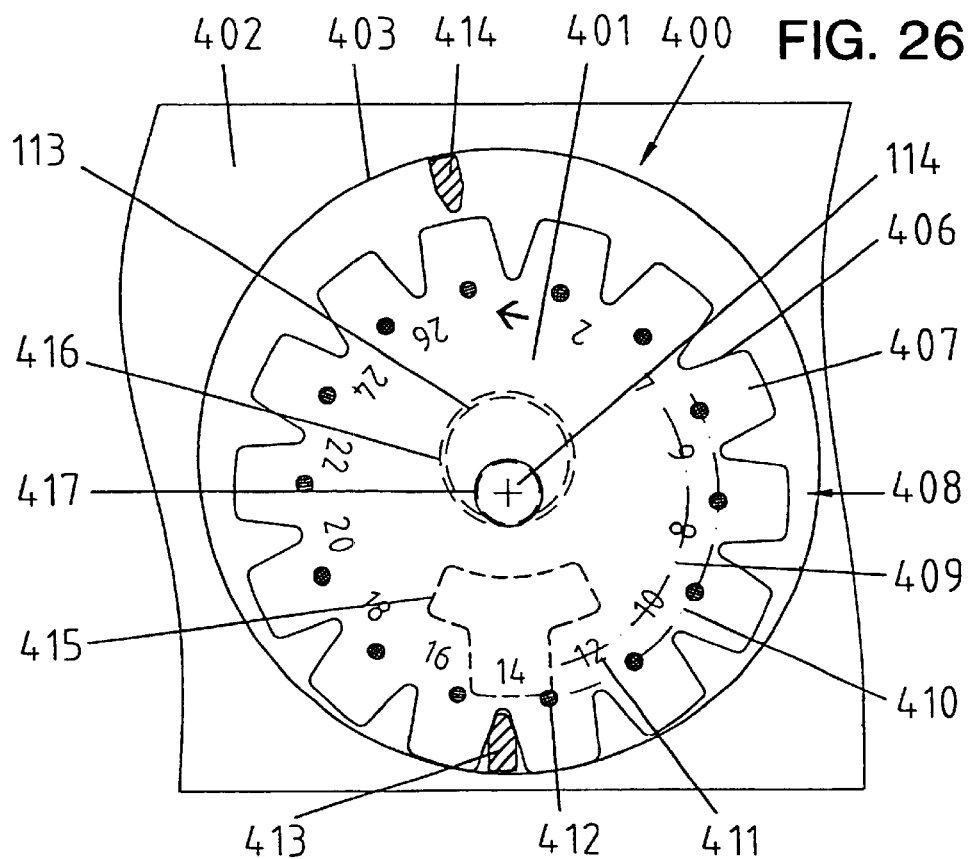
Figure 27D:
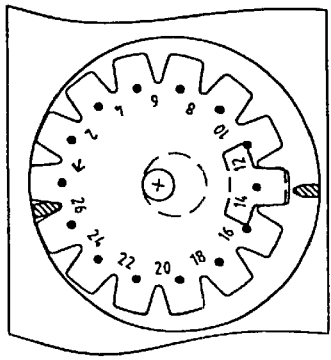
Figure 27C:
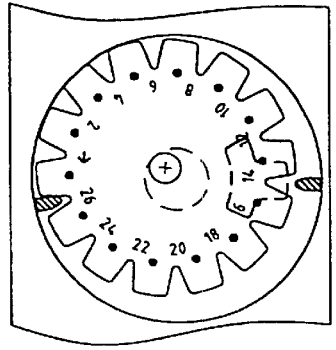
Figure 27B:
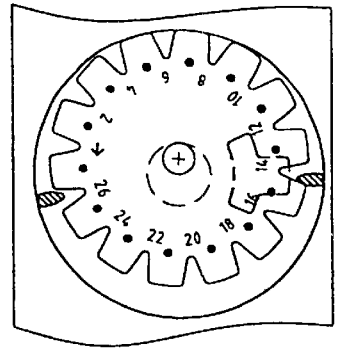
Figure 27A:
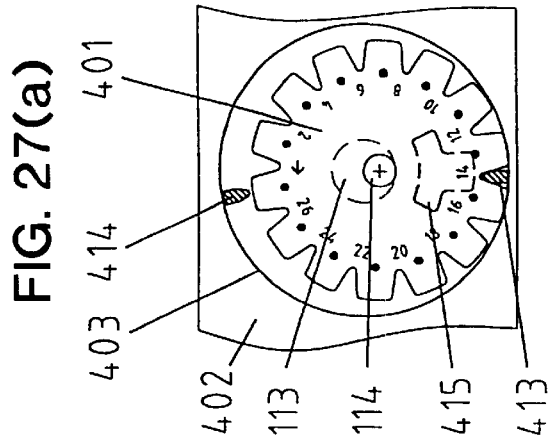
Figure 27H:
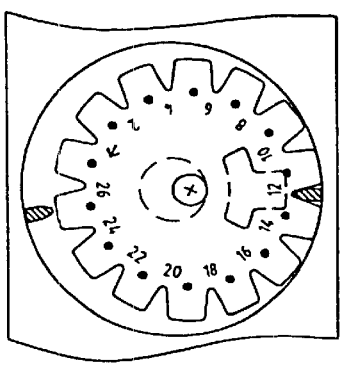
Figure 27G:
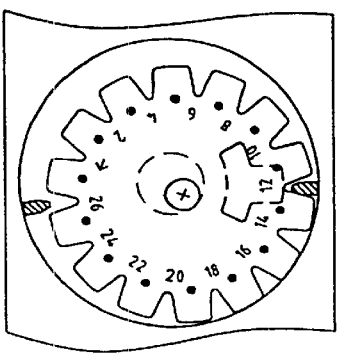
Figure 27F:
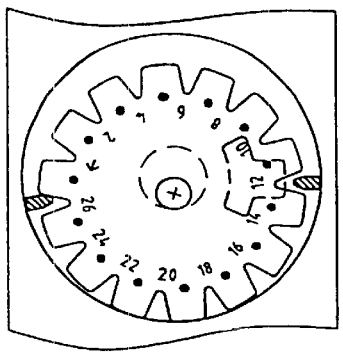
Figure 27E:
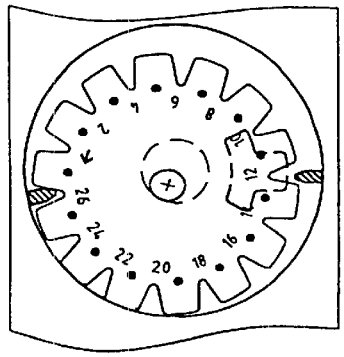
Figure 28:
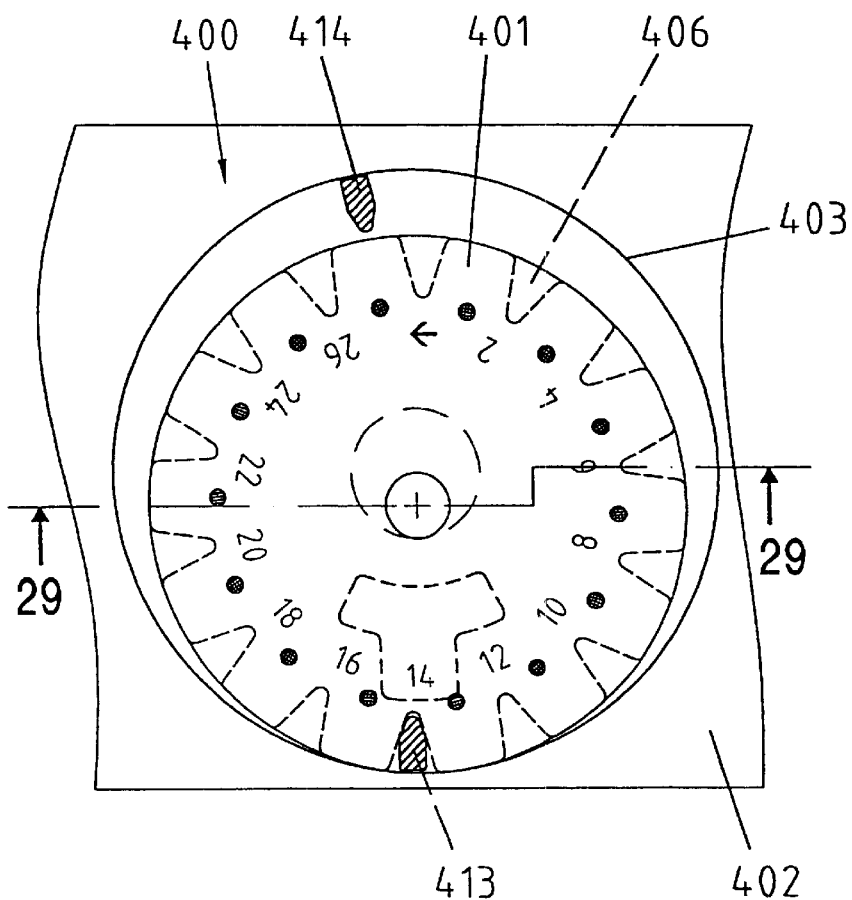
Figure 29:
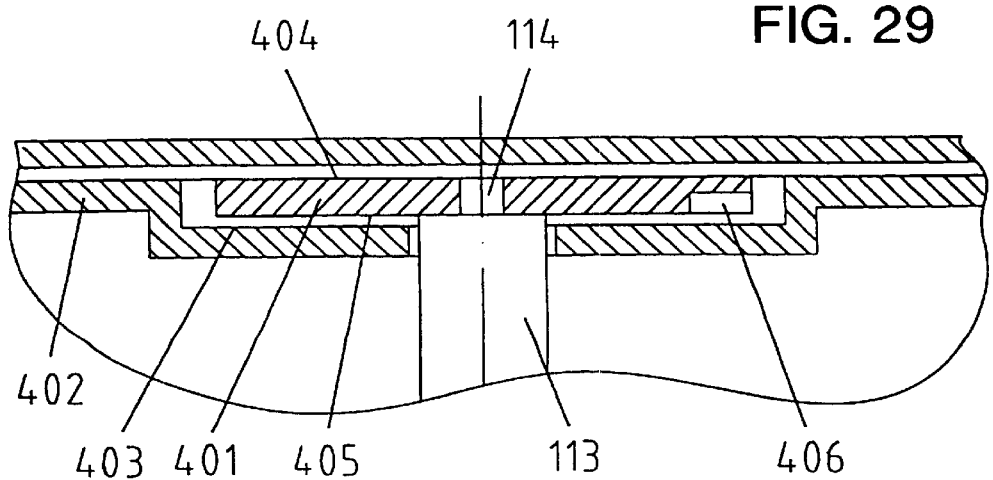
Figure 30:
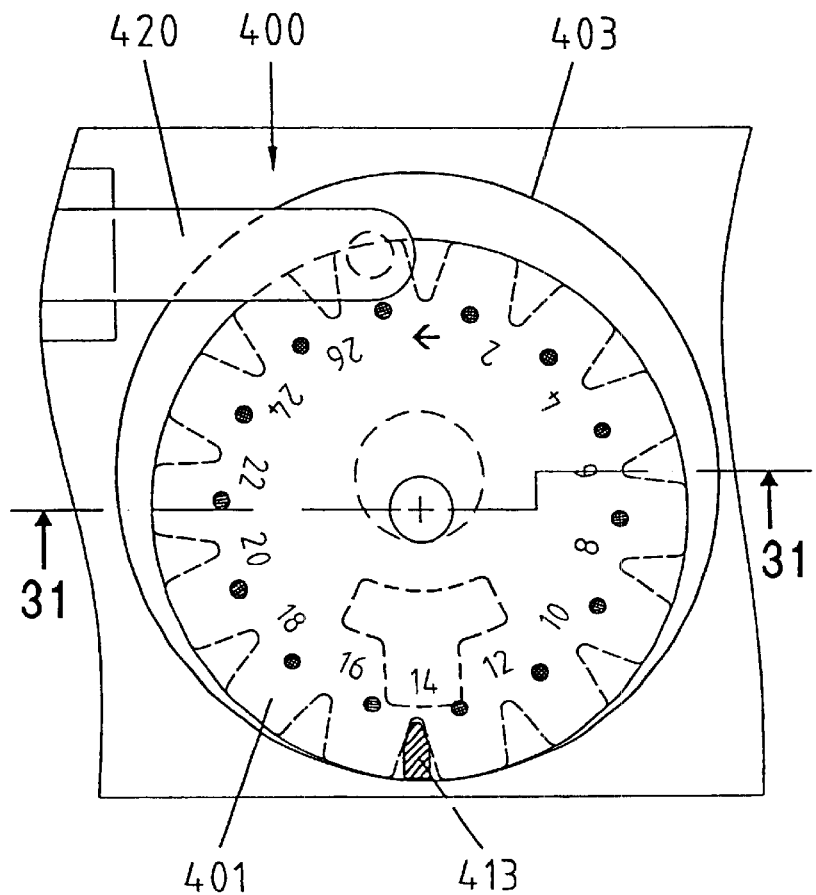
Figure 31:
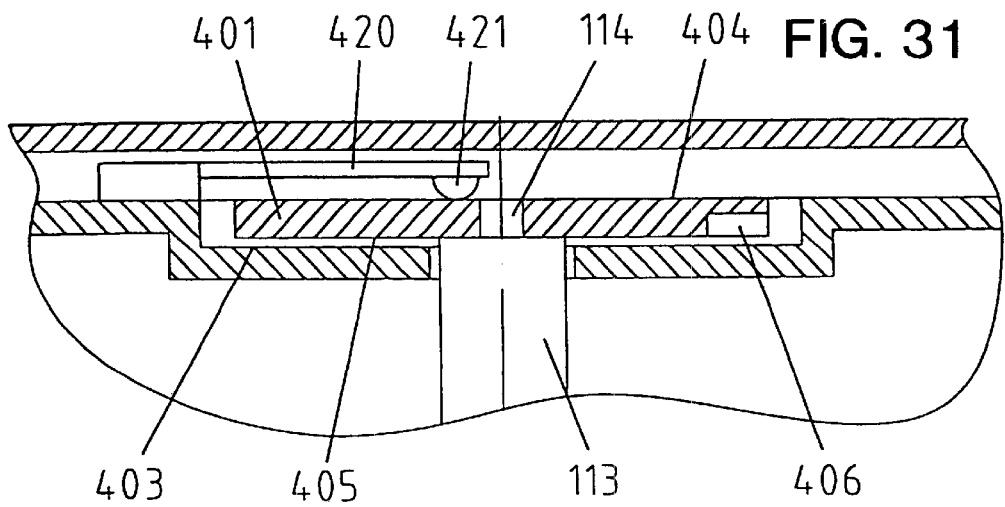
Figure 32:
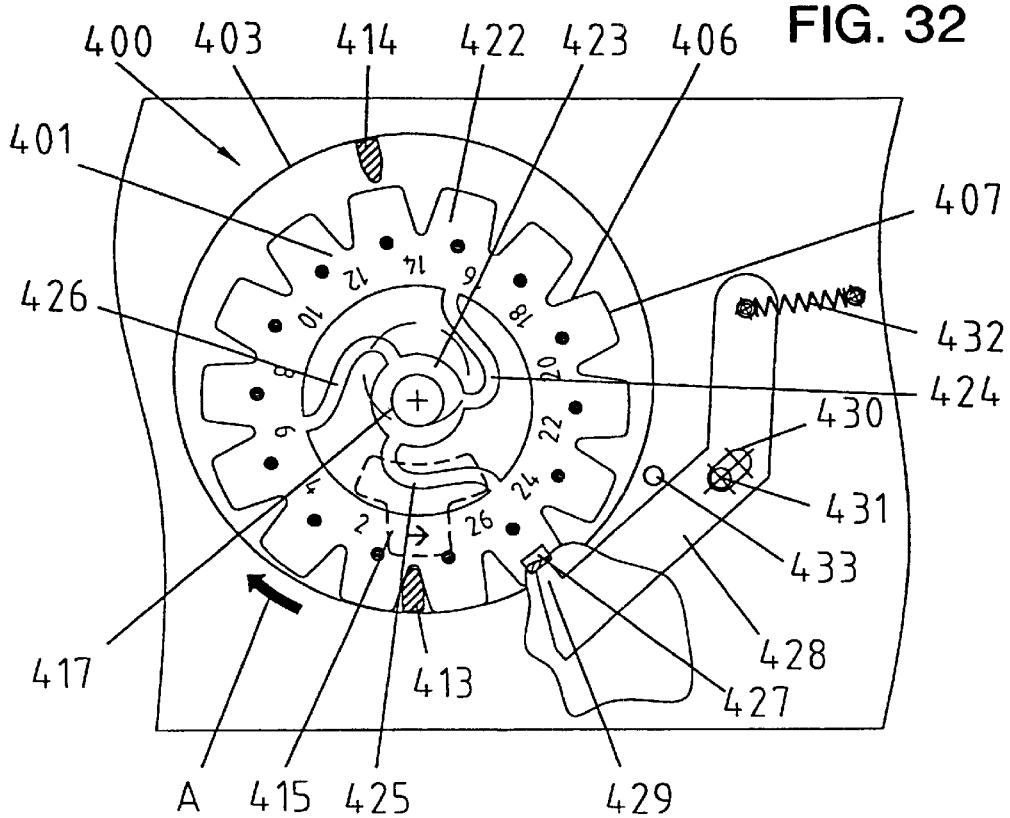
Figure 33:
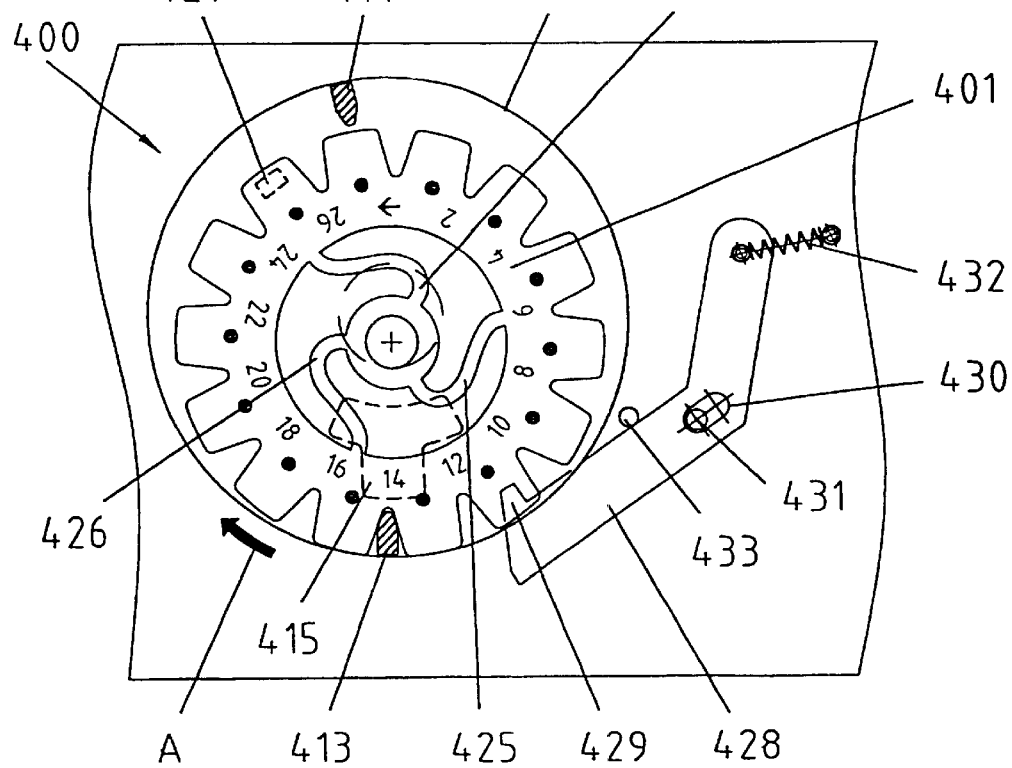
Figure 34:
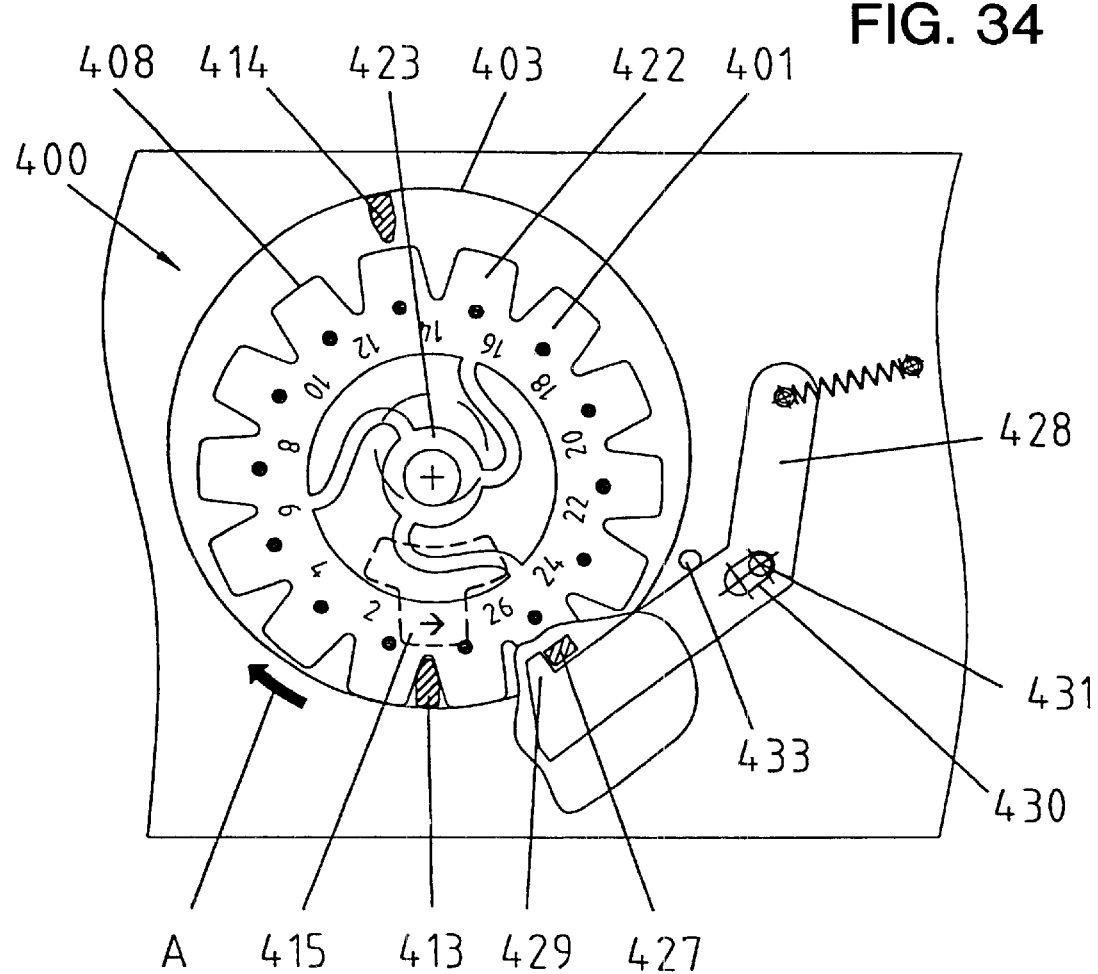
Figure 35:
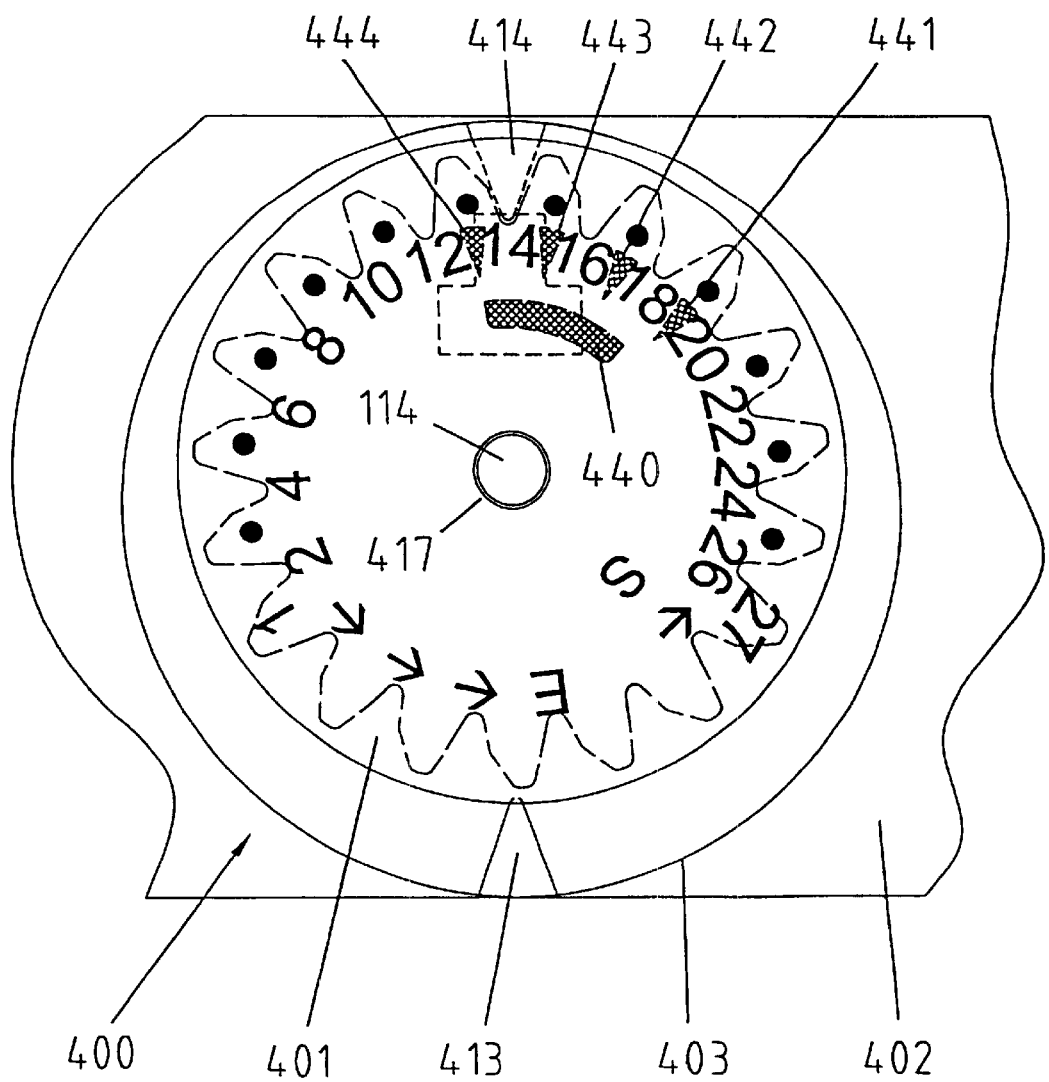
Figure 36:
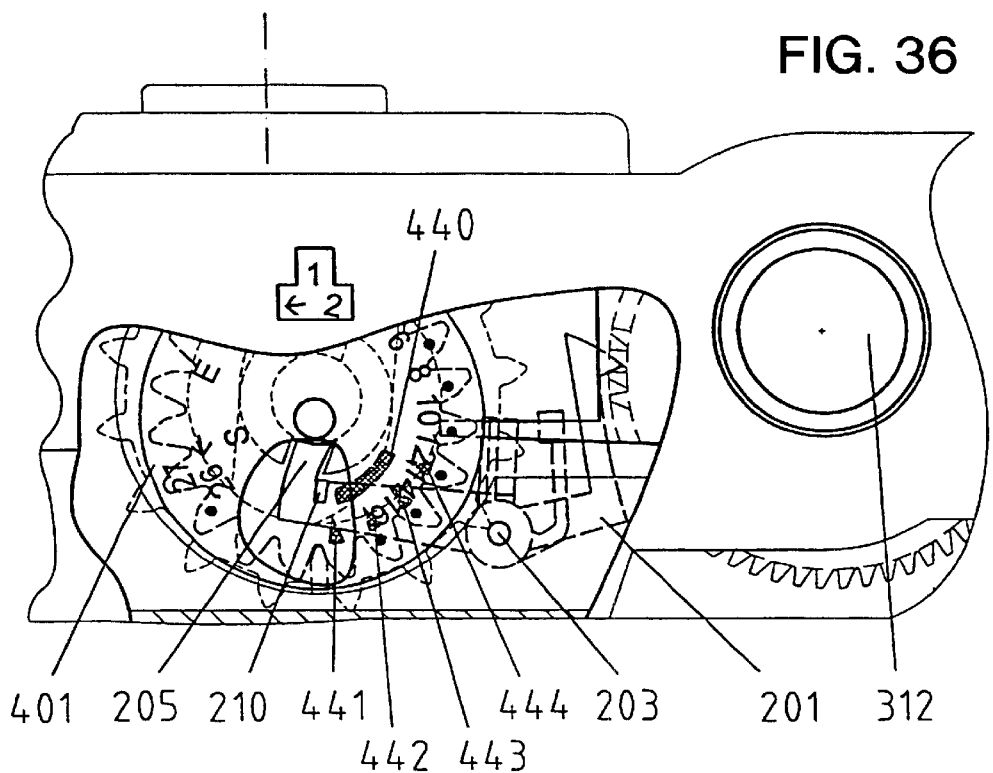
Figure 37:
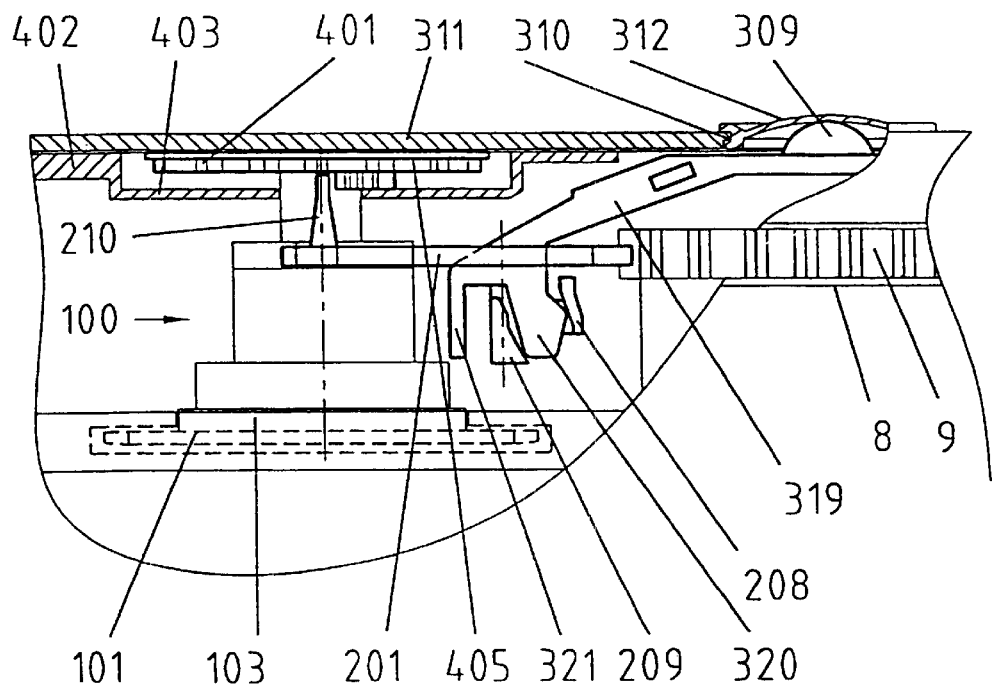
Figure 38:
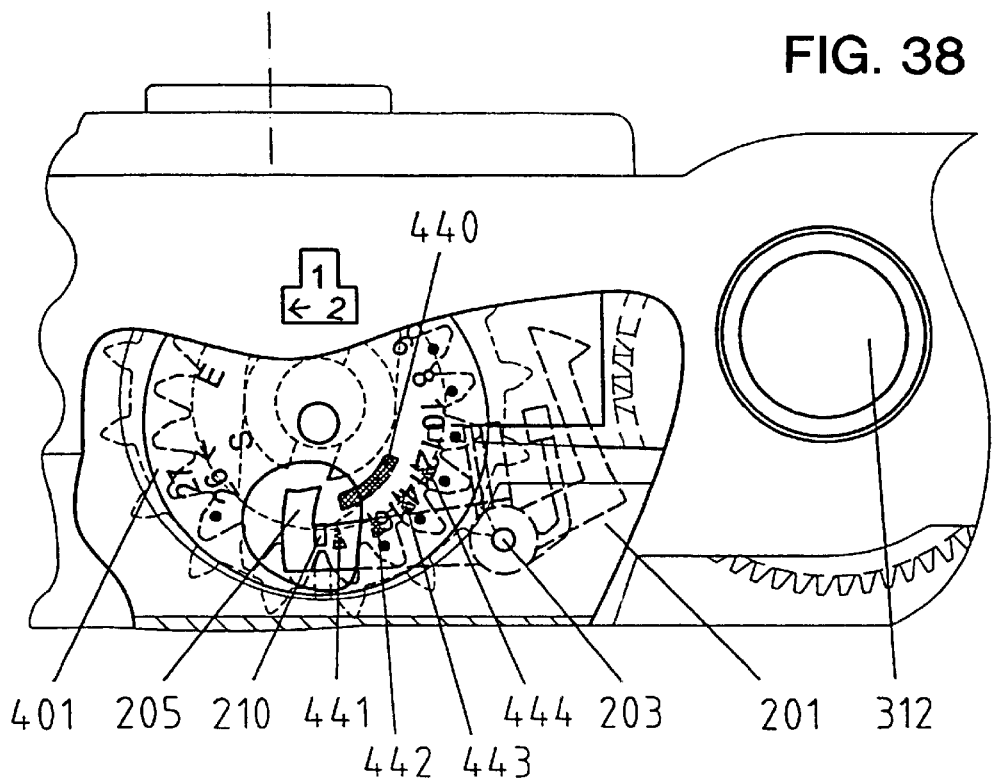
Figure 39:
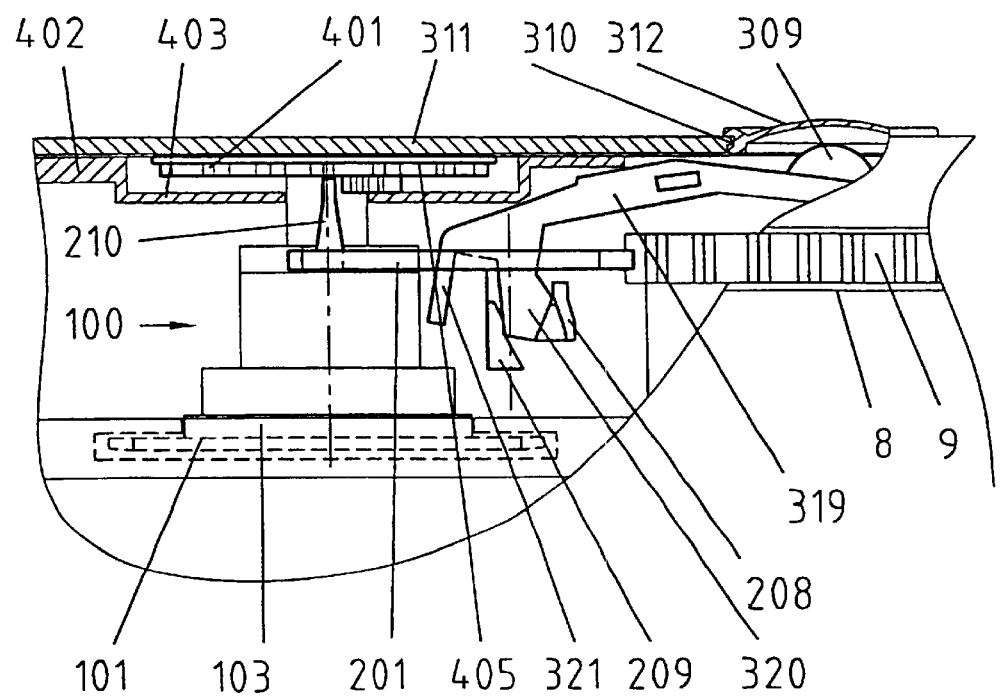
Figure 40:
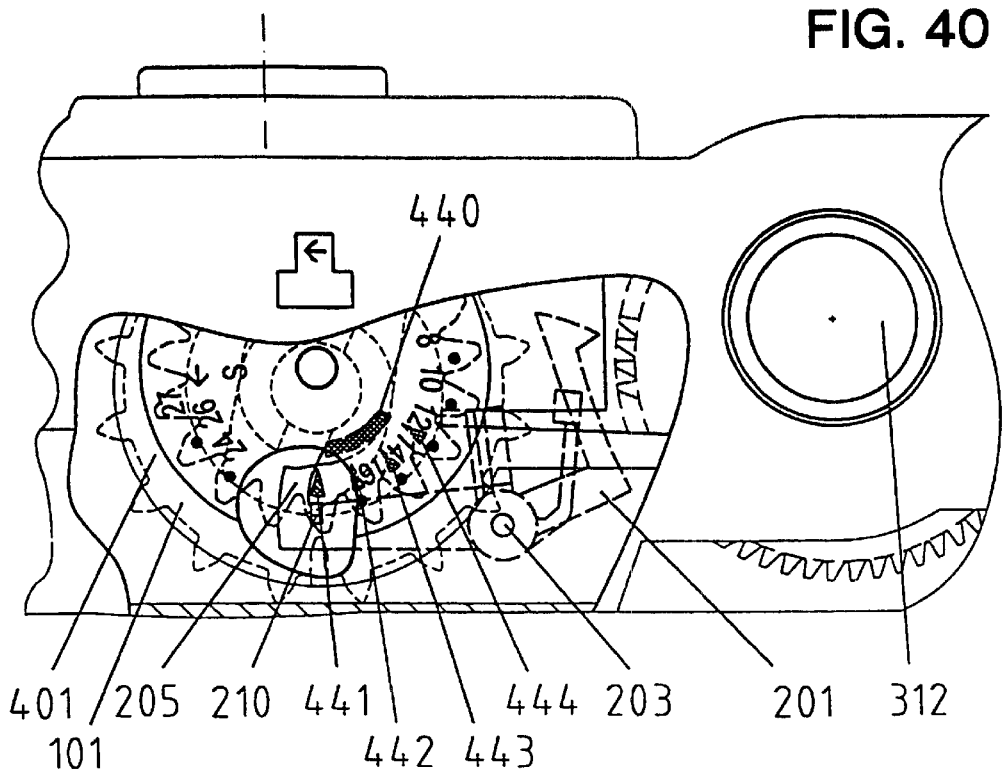
Figure 41:
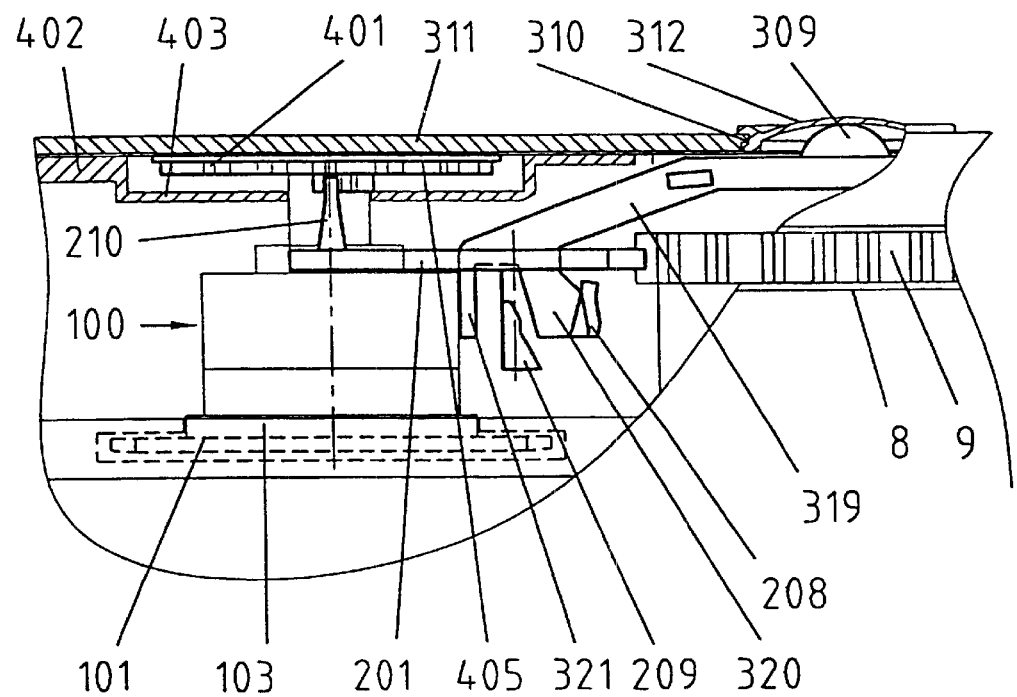
Figure 42:
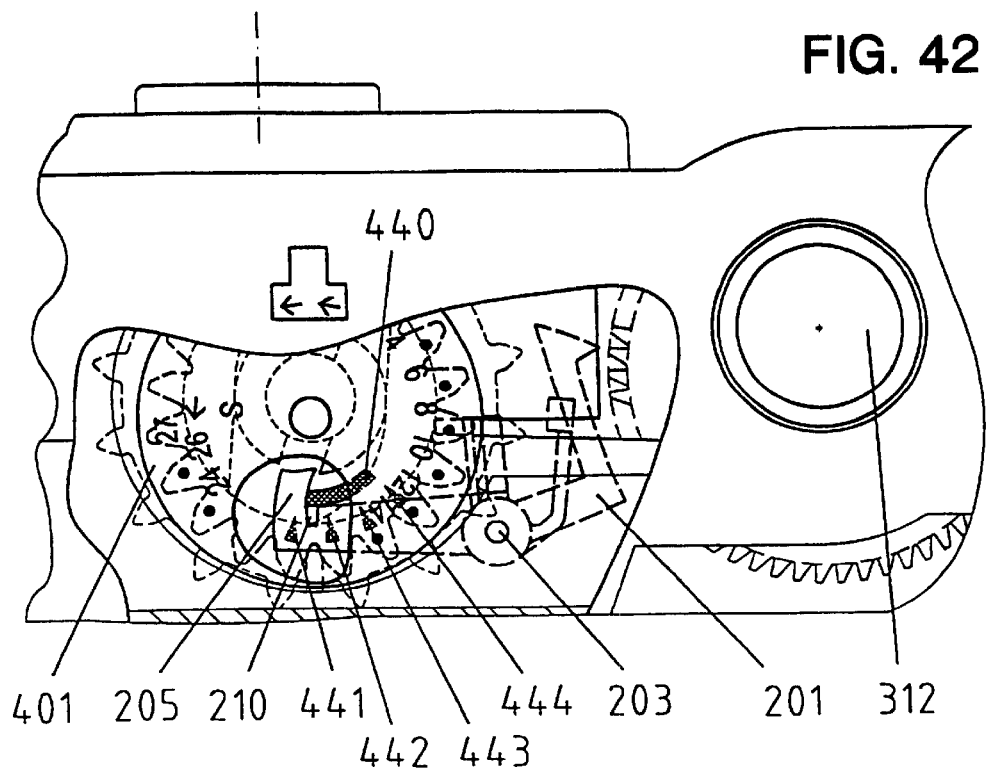
Figure 43:
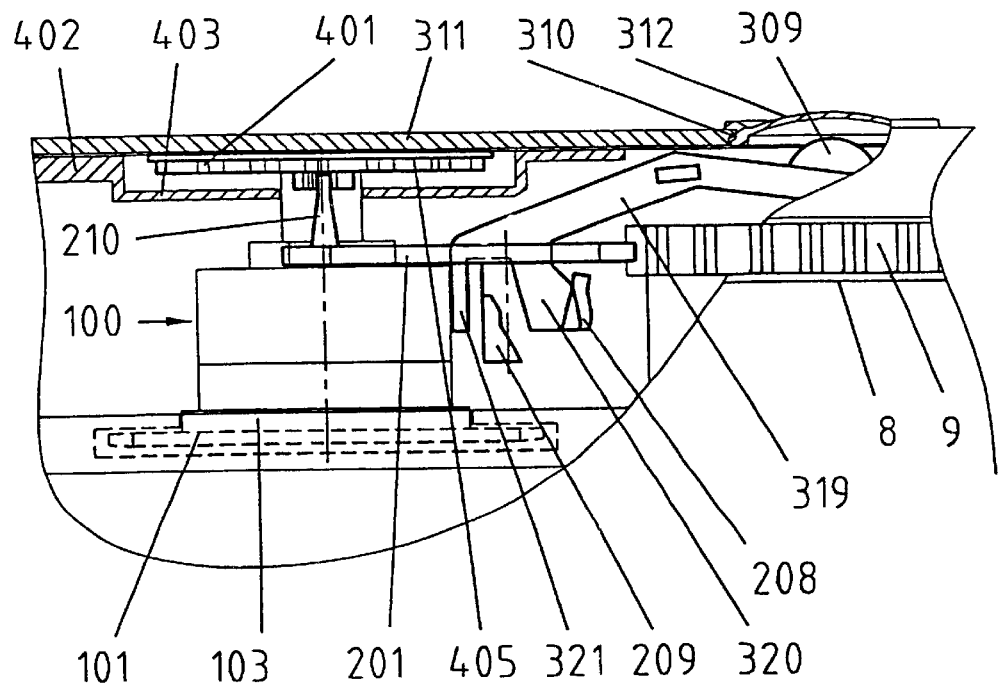

Preferred embodiments of the invention are described in more detail hereinafter with the aid of the drawings, in which:

FIG. 1 is a view from above of the camera according to the invention, with the housing covers shown partly exposed, FIG. 2 is another view, likewise from above, of the camera according to FIG. 1, FIG. 3 is a front view of the camera according to FIG. 2, with the front housing cover removed, FIG. 4 is a separate and enlarged view of the perforation wheel assembly contained in the camera according to FIGS. 1 to 3, FIG. 5 is an exploded view of the perforation wheel assembly according to FIG. 4, FIG. 6 is a side view of the perforation wheel assembly according to FIG. 4 inserted into the camera housing, and parts of the said camera housing in section, FIG. 7 is a view from above of the subject of FIG. 6, FIG. 8 is an exploded view of parts of the subject of FIG. 7, FIG. 9 is a view from above of a feed locking device contained in the camera according to FIGS. 1 to 8 and parts cooperating therewith of a device shown in cross-section to release and actuate a photographic shutter of the camera in a position that does not lock the film feed, FIG. 10 shows parts of the subject of FIG. 9, partly in cross-section and partly in full view, FIG. 11 shows the subject of FIG. 9 in a position locking the film feed, FIG. 12 shows parts of the subject of FIG. 11, partly in cross-section and partly in full view, FIG. 13 is a perspective view seen in the direction from the front cover of the housing, of a locking lever of the feed locking device according to FIGS. 9 to 12, FIG. 14 is a separate plan view of a plate serving for the mounting of a release lever of the camera according to FIGS. 1 to 13, FIG. 15 is a separate plan view of the release lever mounted on the plate according to FIG. 14, FIG. 16 is a cross-section of the plate according to FIG. 14 along the sectional line shown in FIG. 14, FIG. 17 is a front view of the release lever according to FIG. 15, FIG. 18 is a plan view of parts of the camera in the state of release readiness, FIG. 19 is a front view of the subject of FIG. 18, FIG. 20 shows the subject of FIG. 19 after a first partial movement of the release lever, FIG. 21 is a plan view of the subject of FIG. 18 in the shutter release state, FIG. 22 is a front view of the subject of FIG. 21, FIG. 23 is a plan view of the subject of FIG. 22 in the state after actuation of the shutter, FIG. 24 is a front view of the subject of FIG. 23, FIG. 25 is a rear view of the camera with the rear housing cover partly exposed to show the arrangement of the image counting device in the camera, FIG. 26 is an enlarged view of parts of the image counting device according to FIG. 25, FIGS. 27(a) to 27(h) show an image counting disc of the image counting device according to FIG. 25 and show successive steps of the setting to display for example three successive image numbers, FIG. 28 shows a further embodiment of an image counting device as a modification of the image counting device according to FIG. 25, FIG. 29 is a sectional view of the subject of FIG. 28 along the sectional line shown in FIG. 28, FIG. 30 is a further embodiment of an image counting device as a modification of the image counting device according to FIG. 25, FIG. 31 is a sectional view of the subject of FIG. 30 along the sectional line shown in FIG. 30, FIG. 32 is a further embodiment of an image counting device as a modification of the image counting device according to FIG. 25, showing the image counting disc in a starting position, FIG. 33 is a view of the subject of FIG. 32, showing the image counting disc in a further position, FIG. 34 is a view of the subject of FIG. 32, showing the image counting disc in an end position, FIG. 35 is a further embodiment of an image counting device as a further modification and development of the image counting device according to FIG. 25, FIG. 36 shows parts of a camera with the image counting device according to FIG. 35 in the setting to display the image numbers for a last exposure of a sequence of exposures in the functional state before taking this last exposure and with a feed locking device in the setting to lock the film feed, FIG. 37 shows the subject of FIG. 36, partly in section and partly in a rear view, FIG. 38 shows the subject of FIG. 36 after unlocking the film feed, FIG. 39 shows the subject of FIG. 38, partly in section and partly in a rear view, FIG. 40 shows the subject of FIG. 36, partly in section and partly in a rear view, after executing a further winding step in winding on the film, FIG. 41 is a sectional view of the subject of FIG. 40, FIG. 42 shows the subject of FIG. 40, partly in section and partly in a rear view, after executing a further winding step in winding on the film, and FIG. 43 is a sectional view of the subject of FIG. 42.

Several embodiments of the invention are described in detail hereinafter in conjunction with the drawings. In this connection reference numerals used in the individual figures of the drawings to identify the respective parts of illustrated embodiments also apply as appropriate for the corresponding identification of the same or similar parts in other figures, where such parts are not provided with reference numerals.

Type of Photographic Camera

The still picture camera described in more detail hereinafter is preferably a disposable camera preloaded with film by the manufacturer, which is designed for use with "135" roll film. This type of film is a 35 mm film provided on both edges with sets of perforations formed by perforation holes arranged at a permanently constant mutual interspacing. The invention may however also be employed in the same way with multiple use cameras, which first have to be loaded with film by the user in a manner known per se. Instead of use with 35 mm film, the camera may however also be adapted for use with other recording media in strip form that have a set of continuous perforations at least on one of the two edges.

Construction of the Camera

FIGS. 1 to 3 in particular show in simplified form the main features of the construction of an embodiment of a camera for 35 mm roll film. This camera 1 comprises a core assembly 2 that is arranged between a front housing cover 3 and a rear housing cover 4, a film F inserted in the camera being shown only in FIG. 6. A light-proof connection is provided between the core assembly 2 and the rear housing cover 4. A photographic lens 5 for the optical recording of still images on the film inserted in the camera is located on the front of the camera. The core assembly 2 contains a receiving chamber 6 for accommodating a loose film supply spool (not shown) and a receiving chamber 7 for accommodating a film cassette (also not shown) that can be inserted into the camera, as well as a film guide device and a film feed device for guiding the film in the picture-to-picture feed from the film supply spool to the film cassette. Of the film feed device, only the outwardly projecting, knurled film feed wheel 9 is shown by means of a slit 8 in the rear housing cover 4, illustrated for example in FIG. 25, which wheel is connected in a manner known per se and not described in more detail here to a take-up spool of the film cassette and can be manually actuated by the camera user in order to execute the film feed, and more specifically by turning the said wheel in an anti-clockwise direction in the illustration according to FIG. 1.

As shown for example in FIG. 3, a photographic shutter for the image-forming exposure of the film is located in the optical path of the lens in the camera housing. This shutter preferably has only a single shutter blade 10 that is rotatably mounted on a bearing pin 12 integral with the housing and moving in an oblong hole 11 and that is under the action of a spring element, preferably a tension spring 13, that is secured at one of its ends to the shutter blade 10 and at its other end to a pin 14 integral with the housing and that urges the shutter blade 10 towards a stop means 15 integral with the housing. The shutter blade 10 has a lug-type projecting actuation stop 16 for the actuation of the shutter blade 10 in a manner described in more detail hereinbelow. In the unreleased state the shutter blade 10 adopts the position according to FIG. 3 and thereby prevents light passing through the lens 5 falling on that section of the photographic film inserted in the camera that lies in each case on the lens axis in the vicinity of the rear wall of the camera.

The aforedescribed camera also comprises the following structural assemblies:

A perforation wheel assembly 100 that forms a film metering means,

A feed locking device 200 controlled by the rotation of the perforation wheel assembly 100 and that locks the film feed device after the feed of the film by in each case one frame, A device 300 for releasing and actuating the photographic shutter and for unlocking the film feed device after each release of the shutter, as well as An image (exposure) counting device 400 controlled by the perforation wheel assembly for counting and displaying the number of photographs (exposures) that, counting forwards, have already been taken on the photographic film inserted in the camera or that, counting backwards, can still be taken on this film.

In order to mount these structural assemblies the camera housing contains a central partition 17 belonging to the core assembly and an upper partition 18, which are parallel to one another.

The aforementioned structural assemblies and their cooperation are described in more detail hereinafter.

Perforation Wheel Assembly

The perforation wheel assembly 100 serves as a film metering means and to this end cooperates with the film contained in the camera in such a way that the perforation wheel assembly rotates about an axis during the feed of the film in the camera. In addition the perforation wheel assembly 100 serves to control the locking movement of the feed locking device 200, to control the resetting movement of the shutter release device 300 from a disengaged position after release of the shutter to a readiness position for the next following shutter release with the simultaneous tensioning of a spring reservoir of the feed locking device 200, and also to drive the image counting device 400.

As can be seen in particular from FIGS. 3 to 6, the perforation wheel assembly 100 is arranged between an upper wall 17 of the core assembly 2 of the camera and an upper housing wall 18 formed by the two housing covers 3, 4 and is rotatably mounted in a manner described in more detail hereinbelow. The perforation wheel assembly 100 comprises a film perforation wheel, i.e. a sprocket wheel 101 that projects via its edge teeth 102 into the film feed path and engages via the said teeth 102 in a manner known per se and therefore not described in more detail here in a series of edge perforations provided on the film, whereby the wheel is entrained and caused to rotate during the feed of the film. In the illustrated embodiment the circumference of the sprocket wheel 101 is dimensioned so that it executes a rotation of 180° about a central axis of the sprocket wheel with each feed of the film by one frame. The perforation wheel assembly 100 also includes the following further components.

A bearing collar 103 is located immediately above the sprocket wheel 101 and serves for the radial mounting of the said sprocket wheel 101. A cylindrical member 104 with a circumferential cylindrical surface 105 lies above the bearing collar 103. A control cam 106 is located immediately above the cylindrical member 104, with first and second control cam surfaces 107, 108 displaced by 180° relative to one another, in each case increasing spirally in cross-section from a region in the vicinity of the axis to an in each case outer concentric region, the outer concentric regions 109 of the control cam surfaces 107, 108 forming partially cylindrical surfaces that have the same radius as the circumferential cylindrical surface 105 of the cylindrical member 104. The cylindrical member 104 and the control cam 106 with its control cam surfaces together form a control element 104, 106. Upper edge sections of the cylindrical surface 105 form in each case disengagement edges 105a for the device 300 for releasing and actuating the photographic shutter, and the first and second control cam surfaces 107, 108 of the control cam 106 serve in each case to reset the device 300 for releasing and actuating the photographic shutter after the shutter has been released in the course of a following feed of the film by one frame, in a continuous transition to a starting position, and at the same time serve continuously to tension an elastic element of the feed locking device 200, which will also be described in more detail hereinbelow.

A cylindrical grooved disc 110 is located above the control cam 106, and has on its circumference two radially inwardly directed grooves 111, 112 displaced by 180° relative to one another and constitutes a control device for controlling the feed locking device 200, described in more detail hereinbelow, for locking the film feed device.

A shaft frustum 113, which likewise serves for the rotatable mounting of the perforation wheel assembly 100, is located immediately above the grooved disc 110 and carries an eccentric pin 114 eccentrically arranged on an end front face, the said pin serving to drive the image counting device 400 not shown in FIGS. 2 to 8 and described in more detail hereinafter with the aid of FIG. 25 and subsequent figures.

The above-described components 103, 104, 106, 110 and 113 of the perforation wheel assembly 100 are arranged coaxially relative to the sprocket wheel 101 and participate in the rotational movement of the sprocket wheel 101. As FIG. 4 in particular shows, the whole perforation wheel assembly 100 may preferably be formed as a one-piece integral unit and may consist of a single plastics injection moulded part. Accordingly the perforation wheel assembly 100 can be mass produced very cheaply, which has the further advantage that the various components in each case not only have a high dimensional accuracy per se, but also a high dimensional accuracy in their spatial relationship to the other components.

The incorporation of the perforation wheel assembly 100 into the housing of the camera and the rotatable mounting of the perforation wheel assembly 100 in the camera housing will now be described in more detail with the aid of FIGS. 6 to 8.

A first guide plate 115, integral with the housing and located near the rear housing cover 4, is situated above the upper wall 17 of the core assembly 2 of the camera housing, a lower part of the said plate extending inwardly and perpendicular to this rear housing cover 4. The guide plate 115 has a semi-circular indentation 116. On an assembly 117 containing the photographic lens 5, which hereinafter is also termed a lens carrier and on the front of which the core assembly 2 can be mounted, there is provided a second guide plate 118 which, when the lens carrier 117 is in place, lies in the same plane as the first guide plate 115 and likewise has a semicircular indentation 119 which, when the lens carrier 117 is in place, forms a mirror image of the semicircular indentation 116 of the first guide plate 115. When the lens carrier 117 is in place the two indentations 116, 119 of the first and second guide plates 115, 118 form a semicircular opening whose effective diameter is slightly larger than the diameter of the bearing collar 103 of the perforation wheel assembly 100. The distance of the lower surfaces of the first and second guide plates 115, 118 above the upper wall 17 of the core assembly 2 is dimensioned so that the sprocket wheel 101 of the perforation wheel assembly 100 can project into the space between the upper wall 17 of the core assembly 2 and the first and second guide plates 115, 118 and rotate therein without excessive friction. At the same time the bearing collar 103 of the perforation wheel assembly 100 lies in the opening formed by the indentations 116, 119 of the first and second guide plates 115, 118 and there experiences a radial support, with the result that the perforation wheel assembly 100 together with its bearing collar 103 is radially guided by this opening during its rotation about the mid-axis.

In the assembly of the camera the installation of the perforation wheel assembly 100 is effected in such a way that, with the lens carrier 117 not yet in place, the perforation wheel assembly 100 together with its sprocket wheel 101 is inserted underneath the guide plate 115 until the bearing collar 103 of the perforation wheel assembly 100 rests against the indentation 116 of the guide plate 115. Following this the lens carrier 117 is mounted from the front on the core assembly 2, the second guide plate 118 moving over the sprocket wheel 101 of the perforation wheel assembly 100 until the opening formed by the indentations 116, 119 of the first and second guide plates 115, 118 forms a closed circular contour. In this way the sprocket wheel 101 and with it the whole perforation wheel assembly 100 is mounted both axially and radially, thereby permitting a relatively frictionless rotation of the perforation wheel assembly 100 about its mid-axis in this axial and radial mounting. After the lens carrier 117 has been mounted on the core assembly 2 the front housing cover 3 is placed in position, which partially covers the lens carrier 117, as can be seen in particular from FIG. 6.

The installation of the perforation wheel assembly 100 in the camera can thus be effected by simple plug-in operations, which favours an automated assembly of the camera. If, as a departure from the aforedescribed embodiment, the sprocket wheel 101 is designed so that with a feed of the film by one frame it does not execute a half rotation (rotation by 180°) but instead a full rotation (rotation by 360°), the control cam 106 is modified so that it does not have two control cam surfaces 107, 108 but only a single control cam surface, which extends over a large part of the circumference of the control cam 106. Furthermore, in this modification the grooved disc 110 does not have two grooves 111, 112, but only a single groove.

Whereas in the aforedescribed embodiment the rotation of the perforation wheel assembly 100 takes place by entrainment of the sprocket wheel 101 by the film when the latter is fed by the film feed wheel 9, as a departure therefrom an intermediate gear (not shown in the drawings) may also be provided between the film feed wheel 9 and the perforation wheel assembly 100, so that the said perforation wheel assembly is driven by the intermediate gear. In this modification a slip clutch is then conveniently provided between the film feed wheel 9 and the film take-up spool of the film cassette inserted in the camera.

The aforedescribed embodiments for the perforation wheel assembly 100 are examples of the embodiment of a general teaching, according to which in a camera for edge-perforated film with a film feed device 9 and a rotatably mounted sprocket wheel 101 that engages via teeth 102 in the edge perforations of the film and executes a rotational movement when the film is being fed, one side of the sprocket wheel 101 rests against a bearing surface 17 of a housing part 2 and has on its other side a coaxial bearing collar 103 that is rotatably arranged in a bearing opening of a housing part. The sprocket wheel 101 and the bearing collar 103 are preferably formed as a single integral unit.

The sprocket wheel 101 can engage with its external edge region in a circumferential space between housing parts, the said space preferably being formed between the bearing surface 17 and a plate 115, 118 arranged above the latter. This arrangement can form a circular bearing opening in which the bearing collar 103 of the sprocket wheel 101 is radially mounted, and may be formed by first and second partial plates 115, 118 with semicircular recesses 116, 119 arranged symmetrically with respect to one another, which together form the bearing opening for the bearing collar 103 of the sprocket wheel 101.

In the assembly of the camera the sprocket wheel 101 may be inserted into a space bounded by the first partial plate 115 and the second partial plate 118 can then be brought up to the first partial plate 115. The first partial plate 115 may be formed by a housing part and the second partial plate 118 by a lens carrier 117 that can be mounted on a housing part.

The sprocket wheel 101 may be associated with a control device 110 for controlling the feed locking device 200, this control device preferably having a grooved disc 110 joined to the sprocket wheel 101, on which disc rests a locking lever 201 of the feed locking device 200. The grooved disc 110 has at least one groove 111, 112, in which a pawl 205 of the locking lever 201 of the feed locking device 200 can engage.

Furthermore the sprocket wheel 101 may be connected to a control device 104, 106 for controlling the shutter release device 300. This control device can control the sequence of operations of a shutter actuation member 317 and can reset the shutter release device 300 after release of a photographic shutter of the camera from a disengaged position to a readiness position for the renewed release of the shutter. The control device 104, 106 may have at least one control cam surface 107, 108 of outwardly increasing cross-section, against which may rest at least one follower 318, 321 of the shutter release device 300. A follower 318 of the shutter release device for controlling the sequence of operations of a shutter actuation member 317 as well as a further follower 321 of the shutter release device 300 for controlling the resetting from the disengaged position to the release readiness position may preferably rest against the at least one control cam surface 107, 108 of the control element 104, 106.

The at least one control cam surface 107, 108 of the control element 104, 106 for controlling the shutter release device 300 adopts in relation to a control device 110 for controlling the feed locking device 200 a predetermined angular position, preferably in such a way that at least one recess of the control cam surface 107, 108 of the control element 104, 106 is displaced by a slight angle relative to at least one groove 111, 112 of the control device, formed as a grooved disc 110, for the feed locking device 200.

The sprocket wheel 101 may be connected to a control device 114 for an image counting device 400 of the camera. Preferably this control device has an eccentric 114 cooperating with an image counting disc 401 of the image counting device 400.

The sprocket wheel 101 and at least one control device for controlling the feed locking device 200, the shutter release device 300 and/or the image counting device 400 may form a perforation wheel assembly 100, which may be formed as a single integral unit from plastics material.

Feed Locking Device

The feed locking device 200 serves to lock the film feed device after feeding the film in each case by one frame, and is then unlocked again during the release of the photographic shutter of the camera. The feed locking device 200 therefore cooperates with the perforation wheel assembly 100, the film feed wheel 9, and the shutter release device 300. In addition the feed locking device 200 can also be influenced by the image counting device 400.

The feed locking device 200 is illustrated in particular in FIGS. 9 to 13 and includes a locking lever 201, which is shown in perspective from above in FIGS. 9 and 11 and separately in perspective in FIG. 13 from the front housing cover.

The locking lever 201, which is arranged substantially between the perforation wheel assembly 100 and the film feed wheel 9, has four arms and is rotatably mounted via an injection moulded bearing sleeve 202 on a bearing pin 203 secured to the lens carrier 117. On a first lever arm 204 the locking lever 201 has a first pawl 205 that can rest agains the circumference of the grooved disc 110 of the perforation wheel assembly 100 and can engage in one of the grooves 111, 112 of the said grooved disc 110 when one of the grooves of the latter faces the pawl 205 following the rotation of the sprocket wheel 101. On the second lever arm 206 the locking lever 201 has a second pawl 207 that can engage in a knurled section on the circumference of the film feed wheel 9 of the film feed device, in order to lock and prevent the wheel rotating in an anti-clockwise direction (FIG. 3) and thus rotating in the direction of the film feed when the first pawl 205 of the locking lever 201 engages in one of the grooves 111, 112, of the grooved disc 110.

Furthermore, a third lever arm 208 and a fourth lever arm 209 are arranged on the bearing sleeve 202 of the locking lever 201, which arms are shorter than the first and second lever arms 203, 206. The third and fourth lever arms 208, 209 form a fork for receiving a further switching member 320, described in more detail hereinbelow, of the shutter release and actuation device 300.

The third lever arm 208 is elastic and its free end can, under the action of the switching member 320, project out to some extent in the direction of the second lever arm 206, whereupon the third lever arm 208 in the deflected position forms a spring reservoir under the action of which the first pawl 205 of the locking lever 201 rests against the grooved disc 110 of the perforation wheel assembly 100 and engages at the set time in one of the grooves 111, 112 of the grooved disc 110. The elastic deformation and deflection of the third lever arm 208 takes place in such a way that the maximum prescribed elastic deflection of the free end of the third lever arm 208 is achieved immediately before reaching the position in which the first pawl 205 of the locking lever 201 engages in one of the grooves 111, 112 of the grooved disc 110, with release of the energy stored in the third lever arm 208 as a result of its elastic deflection, whereupon the second pawl 207 engages in the knurled section of the film feed wheel 9 and thereby the perforation wheel assembly together with the sprocket wheel 101 and the film feed wheel 9 are in each case prevented from executing any further rotation.

The fourth lever arm 209 serves, after a release of the photographic shutter, to reset the locking lever 201 under the action of the switching member 320 of the shutter release and actuation device 300 to a position in which the film feed wheel 9 and the perforation wheel assembly 100 are released once more, in order to permit a renewed feed of the film by the next successive frame.

The locking lever 201 and the first to fourth lever arms 204, 206, 208, 209 arranged thereon, including the first and second pawls 205, 207 and including the bearing sleeve 202, are preferably formed as a single integral unit and preferably manufactured as a single injection moulded part from plastics material, the shape and dimensions of the third lever arm 208 and the plastics material selected for the manufacture of the locking lever 201 being matched as regards their material properties so as to permit an elastic deflection and resetting of the free end of the third lever arm 208 corresponding to the above description and the following functional description.

In particular, the sequence of the contrary locking and unlocking movements of the locking lever 201 are described in more detail on the one hand as a function of the film feed and on the other hand as a function of the release and actuation of the photographic shutter of the camera, in the course of the following description of the shutter release device.

The aforedescribed embodiments of a feed locking device are examples of the embodiment of the general teaching of providing a spring reservoir 208 in a camera with a film feed device 9 for feeding a light-sensitive film arranged in the camera, a shutter release device 300 for releasing a photographic shutter 10 of the camera, and a feed locking device 200 which, under the action of a spring reservoir 208, can be moved depending on the forward feed of the film by one frame into a locking position that locks the film feed device 9, and can be moved depending on the actuation of the shutter release device 300 into a release position that unlocks the film feed device 9, which spring reservoir 208 is detensioned, i.e. released, when the feed locking device 200 is in the locking position and when it is changed to the release position, and which becomes increasingly tensioned by a control element 104, 106 moved by the feeding of the film during the film feed by a distance of one frame that in each case follows a shutter release. Preferably the spring reservoir 208 of the feed locking device 200 receives a maximum tensioning by the control element 104, 106 shortly before the film feed has completed one full frame and the feed locking device 200 adopts its locking position. The feed locking device 200 can lock the control element 104, 106 in the locking position.

The spring reservoir 208 of the feed locking device 200 may preferably be tensioned by the shutter release device 300 when the latter is placed in a release readiness position by the control element 104, 106 after the shutter has been released. Preferably the spring reservoir 208 of the feed locking device 200 can be tensioned by a switching member 320 of a release lever 301 of the shutter release device 300, this switching member 320 being able to change the feed locking device 200 from the locking position into the release position.

Preferably the feed locking device 200 has a locking lever 201 on which the spring reservoir is formed as a spring-like lever arm 208. The spring-like lever arm 208 may together with a further lever arm 209 of the locking lever form a fork in which the switching member 320 of the release lever 301 of the shutter release device 300 engages, whereby the switching member 320 can, via the further lever arm 209 of the locking lever 201, effect the movement of the feed locking device 200 from the locking position to the release position and, during the following feed of the film, can effect the tensioning of the spring-like lever arm 208.

The feed locking device 200 can be controlled by a further control device 110 that is connected to the control element 104, 106 effecting the tensioning of the spring reservoir 208 of the feed locking device 200. The spring reservoir 208 of the feed locking device 200 can in turn be regulated by the control element 104, 106 and the feed locking device 200 can be regulated by the further control device 110. The said further control device 110 can together with the control element 104, 106 effecting the tensioning of the spring reservoir 208 of the feed locking device 200, form a structural unit and may be provided with the control element 104, 106 effecting the tensioning of the spring reservoir 208 of the feed locking device 200, on a perforation wheel assembly 100 comprising a sprocket wheel 101 of the camera.

Preferably the locking lever 201 of the feed locking device 200 has a pawl 205 that can engage in a groove 111, 112 of the further control device 110 formed as a grooved disc. The locking lever 201 may have a locking pawl 207 that engages in locking teeth of the film feed device 9.

Preferably the feed locking device 200 may be controlled by a further control device 210, 440–444 in such a way that the said feed locking device 200 becomes effectively inoperative in at least one predetermined counting position of an image counting device 400 of the camera. The locking lever 201 of the feed locking device 200 may for this purpose have a stop member 210 that can rest against stops 440, 441, 442, 443, 444 of an image counting disc 401 of the image counting device 400.

Preferably the locking lever 201 of the feed locking device 200 together with its lever arms 208, 209, its pawls 205, 207, and/or its stop member 210 is formed as a single integral unit from plastics material. It may be rotatably mounted on a bearing shaft 202 secured to a lens carrier 117 of the camera.

Shutter Release Device

The shutter release device 300 serves to release and actuate the photographic shutter of the camera and to this end cooperates with the perforation wheel assembly 100 and with the feed locking device 200. The shutter release device, which is illustrated in particular in FIGS. 14 to 24, comprises an in principle three-armed release lever 301, which is shown separately in FIG. 15 in a view from above and in FIG. 17 in a view from the front. The release lever 301 is arranged in a cut-out portion 303 of a plate 302 that is integral with the housing. The plate 302 is shown separately in FIG. 14 in a view from above and in FIG. 16 in a section along the section line shown in FIG. 14. The release lever 301 together with the plate 302 is secured via two web-like connection members 304, 305 of rectangular cross-section on opposite sides 306, 307 of the plate 302 forming the cut-out portion 303. The plate 302 and the release lever 301 secured thereon via the connection members 304, 305 together with the connection members 304, 305 are formed as a single integral unit from plastics material, the said connection members 304, 305 forming short square torsion rods around which the release lever 301 can swivel by torsioning the connection members 304, 305 about a rotational axis defined by the said connection members. The longitudinal axis of the cross-section of the rectangularly shaped connection members 304, 305 is inclined relative to the plane of the plate 302 in order to absorb as far as possible forces acting in an inclined direction on the release lever 301 during the release and actuation of the shutter.

The design and shape of the release lever 301 is described in more detail hereinafter. A spherical cap 309 is formed on a first lever arm 308, which according to FIG. 15 is roughly plate-shaped, which cap projects upwardly through an opening 310 in that region of the housing forming a camera upper part 311. The opening 310 is covered by a membrane 312 secured to the camera upper part 311. The spherical cap 309 can be forced downwards by exerting manual pressure on the membrane 312, whereupon the release lever 301 is swivelled in an anti-clockwise direction about the rotational axis formed by the torsionally nonrigid connection members 304, 305, as illustrated in FIG. 17.

A second lever arm 313 of the release lever 301 has two relatively narrow, angularly bent elastic webs arranged parallel to one another, hereinafter termed spring webs 314, 315. Instead of the two spring webs 314, 315 shown in the drawings, only one spring web or alternatively more than two spring webs may also be provided. These run perpendicular to the rotational axis of the release lever 301 formed by the connection members 304, 305 and have at their end a transverse web 316 with a forwardly projecting actuation arm 317 parallel to the rotational axis of the release lever 301 to actuate the shutter blade 10, as well as a cam-shaped projection 318 aligned perpendicular to this rotational axis, which forms a follower for tracing control surfaces of the control element 104, 106 of the perforation wheel assembly 100 in the axial direction.

The release lever 301 furthermore has a third lever arm 319 that for the most part runs parallel to the second lever arm 313, but which is preferably rigid. The third lever arm 319 has on a downwardly bent end shown in the illustration according to FIG. 17, the switching member 320 mentioned in the preceding descriptive section "Feed locking device", as well as a follower 321 which serves for the mainly radial tracing of control surfaces of the control element 104, 106 of the perforation wheel assembly 100. The switching member 320 engages in the space between the fork-forming third and fourth lever arms 208, 209 of the locking lever 201 of the feed locking device 200.

The sequence of events of the effective operation in connection with the shutter release will now be described in more detail hereinafter.

FIGS. 18 and 19 show the camera in the release-ready state, in which according to FIG. 9 the first pawl 205 of the locking lever 201 of the feed locking device 200 engages in one of the grooves 111, 112 of the grooved disc 110 of the perforation wheel assembly 100 and the second pawl 207 of this locking lever 210 engages in the knurled section of the film feed wheel 9, which is thereby locked against further rotation in the film feed direction. At the same time the elastic third lever arm 208 of the locking lever 201 adopts a position in which it is detensioned.

The release lever 301 is not, or at most only slightly pretensioned in its spring webs 314, 315, so that a follower 318 formed as a cam-shaped projection rests against the cylindrical wall surface 105 of the cylindrical member 104 of the perforation wheel assembly 100. The control cam surfaces 107, 108 of the control cam member 106 of the perforation wheel assembly 100 adopt an angular position as can clearly be seen in FIG. 19.

If the camera user forces the spherical cap 309 downwards by pressing the membrane 312 as illustrated in FIG. 19 in order to release the shutter, the release lever 301 as a result of the torsioning of the connection members 304, 305 executes a swivelling movement about the axis of the said connection members in an anti-clockwise direction. However the second lever arm 313, which carries the shutter actuation arm 317, can on account of the engagement of the cam-shaped projection 318 on the cylindrical wall surface 105 of the cylindrical member 104 of the perforation wheel assembly 100, participate in this swivelling movement of the release lever 301 only to the extent that this lever arm 313 moves upwardly from the position according to FIG. 19 in the direction of the position according to FIG. 20, the spring webs 314, 315 thereby being more severely bent, with a decrease in the angle enclosed by them. An elastic stress is thereby created in the spring webs 314, 315 as a result of the properties of the plastics material from which the release lever 301 is formed as a single unit, with the result that the release lever 301 becomes an energy reservoir in its part comprising the spring webs 314, 315.

If the release lever 301 is swivelled far enough by pressing the membrane 312, the cam-shaped projection 318 disengages from one of the upper edges 105a of the cylindrical wall surface 105 of the cylindrical member 104 of the perforation wheel assembly 100. FIG. 20 shows the position of the release lever 301 shortly before the disengagement of the cam-shaped projection 318 from the upper edge 105a of the cylindrical wall surface of the cylindrical member 104.

After the disengagement of the cam-shaped projection 318 from the upper edge of this wall surface 105 forming a disengagement edge 105a, the mechanical stress built up in the spring webs 314, 315 causes a sudden sharp release of tension in the said spring webs 314, 315 and the shutter actuation arm 317 moves very rapidly to the right in an anti-clockwise direction from the position according to FIG. 20 to a position shown in FIGS. 21 and 22, with release of the energy stored in the spring webs 314, 315. In the movement from the position according to FIG. 20 to the position according to FIGS. 21 and 22 the actuation arm 317 of the release lever 301 engages the actuation stop 16 of the shutter blade 10 and rotates the latter in a spinning movement in a clockwise direction against the action of the tension spring 13. At the same time the release lever 301 together with its shutter actuation arm 317 disengages once more from the actuation stop 16 of the shutter blade 10 and rests with its cam-shaped projection against a first section, of spiral cross-section, of the for example first control cam surface 107 of the control cam member 106, as can be seen in particular in FIG. 22.

As a result of the aforedescribed spinning movement of the shutter blade 10, the shutter is opened for a short time in the optical path of the lens, whereupon an image is recorded on the film inserted in the camera. The opening duration of the shutter is restricted in a predetermined manner since the shutter blade 10 is rapidly restored to the closed position by its tension springs 13. In this way the shutter blade 10 achieves the functional state illustrated in FIG. 22.

The per se rigid third lever arm 319 of the release lever 301 also participates in the aforedescribed swivelling movement of the release lever 301 to open the shutter by engaging the shutter blade 10. In this swivelling movement the lever arm 319 with its switching member 320 engages the fourth lever arm 209 of the locking lever 201 of the feed locking device and thereby swivels the locking lever 201 in such a way that the locking lever 201 together with its first and second pawls 205, 207 is lifted from the respective groove of the grooved disc 110 of the perforation wheel assembly 100 and from the knurled section of the film feed wheel 9, with the result that the film feed wheel 9 and the perforation wheel assembly 100 are unlocked. Although the elastic lever arm 208 of the locking lever 201 also participates in this unlocking movement of the locking lever 201, it remains however in its detensioned state that it had also already previously adopted.

After this unlocking of the film feed wheel 9 and perforation wheel assembly 100, the film can be moved again by one frame by manually actuating the film feed wheel 9. The switching procedures that take place are described in more detail hereinafter.

On executing this film feed movement the sprocket wheel 101 and with it the whole perforation wheel assembly 100 are caused to rotate and turn by 180° about the rotational axis of the sprocket wheel 101. The functional state after a first partial rotation of about 45° is illustrated in FIGS. 23 and 24. In the aforedescribed rotation of the perforation wheel assembly 100 by 180° the release lever 301 is displaced continuously in a clockwise direction as a result of the engagement of the follower 321 of the lever arm 319 and of the cam-shaped projection 318 of the lever arm 313 of the first control cam surface 107, of spiral cross-section, of the control cam 106. This produces on the one hand a resetting of the release device 300 to the position of release readiness, and on the other hand produces a loading of the spring reservoir 208 of the feed locking device 200, as described in more detail hereinafter.

In the resetting of the release lever 301 the actuation stop 16 of the shutter blade 10 on account of its mounting in the oblong hole 11 escapes and moves downwardly for a short time against the action of the tension spring 13, without however resulting in a renewed opening of the shutter. At the same time the tension builds up again in the spring webs 314, 315 once the spherical cap 309 rests against the membrane 312, with the result that the cam-shaped projection 318 of the release lever 301 slides from the first control cam surface 107 of the control cam 106 of the perforation wheel assembly 100 onto the cylindrical wall surface 105 of the cylindrical member 104, until the perforation wheel assembly 100 in the course of the aforementioned rotation by 180° has reached such an angular position that the cam-shaped projection 318 of the release lever 301 rests on the partially cylindrical circumferential section 109 of the first control cam surface 107 of the control cam 106.

The sliding of the cam-shaped projection 318 of the release lever 301 from the partially cylindrical circumferential section 109 of the first control cam surface 107 of the control cam 106 onto the cylindrical wall surface 105 of the cylindrical member 104 leads to a practically complete detensioning of the spring webs 314, 315 of the release lever 301, with the result that after the perforation wheel assembly 100 has completed the 180° rotation, the release lever 301 reaches a position corresponding to the position according to FIGS. 14 and 15, but with the difference that the positions of the first and second control cam surfaces 107, 108 of the control cam 106 of the perforation wheel assembly 100 are reversed compared to the initial state according to FIGS. 14 and 15 as a result of their intermediate rotation by 180°. At the same time the spring reservoir of the release device 300 formed by the spring webs 314, 315 is practically detensioned once again.

Furthermore, as a result of the resetting of the release lever 301 to its initial position, produced by the respective control cam surface 107 and 108 of the control cam 106 of the perforation wheel assembly 100, the switching member 320 of the release lever 301 comes to rest against the third lever arm 208 of the locking lever 201 of the feed locking device and the free end of this third lever arm 208, utilising its elasticity with increasing angular displacement of the control cam 106 of the perforation wheel group 100, is increasingly pushed back in the direction of the second lever arm 206, with the result that an elastic tension is increasingly built up in the third lever arm 208, the effect of which is that the locking lever 201 together with its first pawl 205 is applied with increasing pressure against the grooved disc 110. The lever accordingly engages in the groove of the grooved disc 110 facing the pawl 205 when the perforation wheel assembly 100 has completed its rotation of 180°. The increasing elastic deformation of the third lever arm 208 of the locking lever 201 of the feed locking device corresponding to the rise of the respective control cam surface 107 and 108 of the control cam 106 means that the energy stored in the third lever arm 208 as a result of its increasing elastic deformation only reaches the maximum value when the sprocket wheel 101 and thus also the grooved disc 110 have almost completed their rotation of 180°. The spring tension in the third lever arm 208 of the locking lever 201 thus achieves its full value only shortly before the grooved disc 110 reaches the angular position in which the first pawl 205 of the locking lever 201 engages in the now presented groove 111 or 112 of the grooved disc 110 and thereby locks the film feed wheel 9. On account of the engagement of this pawl 205 in the respective groove of the grooved disc 110 the third lever arm 208 springs back to its tensionless starting position, so that the tension that has built up in the lever arm 208 is dissipated once more.

Shortly before the perforation wheel assembly 100 completes its 180° rotation and the locking lever 201 together with its pawl 205 engages in the in each case newly presented groove 111 or 112 of the grooved disc 110, the follower 321 of the third lever arm 319 of the release lever 301 disengages from the in each case traced control cam surface 107 or 108 and from the partially cylindrical surface 109 of the control cam 106 following in each case in the rotational direction of the perforation wheel assembly 100, since the angular position of the transition from the respective partially cylindrical surface 109 of the control cam 106 to the control cam surface 107 or 108 recessed from the partially cylindrical surface 109 in the transition region and in each case following in the rotational direction of the perforation wheel assembly 100, is only slightly displaced relative to the angular position of the groove 111 or 112 of the grooved disc 110. When therefore on rotation of the perforation wheel assembly 100 the pawl 205 of the locking lever 201 engages in the groove 111 or 112 of the grooved disc 110, the follower 321 of the lever arm 319 of the release lever 301 has already shortly before this left the respective partially cylindrical surface 109 of the control cam 106. However, despite this the follower 321 can no longer follow the recess of the adjacent control cam surface 107 or 108, since the cam-shaped projection 318 of the lever arm 313 of the release lever 301 again rests against the cylindrical wall surface 105 of the cylindrical part 104 and prevents a reverse rotation of the lever arm 319 of the release lever 301.

The angular displacement between the transition region of the respective partially cylindrical surface 109 and the adjacent control cam surface 107 or 108 and the in each case associated groove 111 or 112 of the grooved disc 110 is kept so small that there is only a very slight danger of an undesired release of the shutter by the user of the camera before completion of a respective film feed by a full frame and accordingly before completion of a 180° rotation of the perforation wheel assembly 100 in the angular range of the angle of rotation of the perforation wheel assembly, in which the follower 321 of the lever arm 319 of the release lever 301 has already left the partially cylindrical surface 109 of the control cam 106 of the perforation wheel assembly 100 and is thus disengaged, whereas the locking lever 201 of the feed locking device 200 has not yet engaged in the associated groove 111 or 112 of the grooved disc 110.

As for the rest, the following comments may be made: if after taking a photographic exposure the user of the camera accidentally does not wind on the film by a full frame on account of an only partial actuation of the film feed wheel 9, for example the film feed is discontinued after, say, half a frame, then the perforation wheel assembly 100 too has still not completed the initiated rotational movement of 180°. In this intermediate state the release lever 301 is still locked against any renewed actuation. The elastic third lever arm 208 of the locking lever 201 is still not fully deflected and the spring reservoir formed by the third lever arm 208 is thus still not fully loaded, so that the danger of a deterioration of the elasticity of the third lever arm 208 as a result of possible cold flow processes is advantageously also reduced and can in practice be ignored if the camera, after an only partially executed winding on of the film by the user, is left or kept for a relatively long time in this intermediate state before the interrupted winding on of the film to a complete frame is completed, prior to subsequently taking a further photographic exposure. On the other hand a reserve of energy required to move the locking lever 201 to its locking position is built up by the preferably elastic shape of the third lever arm 208 of the locking lever 201, formed as a single integral unit, without having to provide a separate spring to displace the locking lever 201 to the locking position.

Similar comments also apply to the energy reserve of the release device 300 built up by the spring webs 314, 315.

In order that the return of the release device 300 from the disengaged position it adopts after a release of the shutter to the readiness position for a renewed release of the shutter is effected by the control element 104, 106 of the perforation wheel assembly, which moves only during feeding of the film, an accidental renewed release of the shutter after an intentional release of the shutter and before the film has been wound on is not possible, which is why in the aforedescribed camera a separate locking device to prevent a double exposure preferably does not have to be provided.

The aforedescribed embodiment of a shutter release device is an example of the embodiment of the general teaching, according to which in a camera with a film feed device 9 for feeding a light-sensitive film arranged in the camera, a photographic shutter 10 arranged in the optical path for taking exposures and intended for the image-producing exposure of the light-sensitive film, and a shutter release device 300 which before the release of the shutter adopts a readiness position and after the release of the shutter adopts a disengaged position and has a spring reservoir 314, 315 that is tensioned by displacement of the shutter release device from the readiness position to the disengaged position in order to actuate the shutter 10, the shutter release device being able to return from the disengaged position to the readiness position, a spring reservoir 314, 315 of the shutter release device 300 should be provided in such a way that it is not under tension in the readiness position and in the disengaged position, and a control element 104, 106 that moves during feeding of the film should be provided for returning the shutter release device 300 from the disengaged position to the readiness position. Preferably the spring reservoir 314, 315, which is not under tension in the loading position of the shutter release device 300, is temporarily tensioned and then detensioned once again during the return of the shutter release device to the readiness position.

The shutter release device 300 may preferably have a first follower 318, cooperating with the control element 104, 106, for tensioning and detensioning the spring reservoir 314, 315, this first follower 318 for detensioning the spring reservoir 314, 315 being guided over a disengagement edge 105a of the control element 104, 106. In addition the shutter release device 300 may have a second follower 321 cooperating with the control element 104, 106, for returning the shutter release device 300 from the disengaged position to the release readiness position.

The control element 104, 106 may have at least one control cam surface 107, 108 that can be traced by the first follower 318 and the second follower 321 of the shutter release device 300.

Preferably the shutter release device 300 may have a multi-arm release lever 301 that contains the spring reservoir 314, 315 on a lever arm (313). In this connection the spring reservoir 314, 315 may be formed by one or more elastic webs of the lever arm 313, which in turn may contain the first follower 318. The lever arm 313 may have a shutter actuation member 317 that can cooperate with the shutter 10 via a unilaterally acting coupling 16.

Preferably the second follower 321 may be arranged on a further lever arm 319 of the release lever 301. This second follower can be released from the control element 104, 106 when the shutter release device 300 is in the release readiness position. In particular, the release of the second follower 321 from the control element 104, 106 may take place shortly before completion of the film feeding procedure by in each case one frame. Preferably the release of the second follower 321 from the control element 104, 106 takes place shortly before a further control device 110 for a feed locking device 200 of the camera effects the movement of the feed locking device 200 to a locking position.

The control element 104, 106 for the shutter release device 300 and the further control device 110 for the feed locking device 200 may preferably be connected to one another and preferably also in an immovable manner to a sprocket wheel 101 of the camera. The control element 104, 106 and/or the further control device 110 may together with a sprocket wheel 101 of the camera be formed as a single integral unit from plastics material.

Preferably the further lever arm 319 of the release lever 301 may have a switching member 320 that cooperates with a feed locking device 200 of the camera. A further lever arm 308 of the release lever 301 may form a release key with a release handle 312. The release lever 301 together with the lever arms 308, 313, 319 and including the spring reservoir 314, 315 may be formed as a single integral unit from plastics material. Preferably the release lever 301 together with a carrier plate 302 of the camera is formed as a single integral unit from plastics material and is rotatably connected thereto via torsionally non-rigid connection members 304, 305.

Image (Exposure) Counting Device

The sprocket wheel 101 is connected to an image counting device 400 that is described by way of several embodiments hereinafter. In these embodiments the image counting device counts the number of exposures that have already been taken and indicates in each case how many exposures still remain before the film contained in the camera is fully used up.

In the aforementioned embodiments a sequence of 27 exposures can be taken in succession on a film inserted in the camera, after an empty frame corresponding to a conventional film leader strip and preceding the first exposure, the said sequence also being followed by one or more empty frames corresponding to a conventional film end strip. In order to notify the user of the camera how many exposures still remain on the film used in each case, the image counting device 400, which is preferably integrally and rigidly connected to the film feed device of the camera, is set so as to count the 28 countable objects consisting of one empty frame and 27 exposures. In the illustrated embodiments the image counting device counts in the succession of feed steps involved in the image-producing film feed, starting from a "Start" empty frame, backwards from the exposure number 27 to the exposure number 1 and then to a final "End" empty frame.

A first preferred embodiment of this image counting device 400 is shown in FIGS. 25 to 27 and is described in more detail hereinafter.

The core component of the image counting device 400 is an image counting disc 401 that is arranged in a flat depression 403 of a plate 402 located immediately underneath the upper housing wall of the camera and secured to the core assembly 2. This flat depression 403 forms a carrier tray in which the image counting disc 401, which is coupled to the eccentric pin 114 of the perforation wheel assembly 100, is rotatably and displaceably mounted in a manner described in more detail hereinafter.

The image counting disc 401, shown enlarged in FIG. 26, is formed as a thin circular small plate preferably of plastics material and comprises an upper surface 404 and a lower surface 405. The upper surface 404 of the image counting disc 401 includes a set of 28 counting marks corresponding to the number of 28 objects to be counted, which are described in more detail hereinbelow.

The image counting disc 401 has on its external, circular circumference a set of 14 notch-shaped indents, hereinafter termed notches 406 for the sake of brevity, and which are distributed at constant angular intervals around the circumference of the image counting disc 401. The number of notches 406 corresponds to half the number of counting marks, totalling 28, arranged on the image counting disc 401. The notches 406 are in each case wedge-shaped and arranged so that their wedge vertices point in each case towards the mid point of the image counting disc 401 and lie on a notch circle concentric with the mid point of the image counting disc 401. Trapezoidal teeth 407 are formed between every two adjacent notches 406 and together form on the image counting disc 401 a toothed ring 408 consisting of 14 teeth 407.

The 28 counting marks are arranged on the image counting disc 401, half and half on two counting mark circles 409, 410 concentric with the centre of the image counting disc 401. The radius of the inner counting mark circle 409 is preferably less than and the radius of the outer counting mark circle 410 is preferably equal to or greater than the radius of the notched circle on which the wedge vertices of the notches 406 lie. The mutual interspacing of the two counting mark circles 409, 410 corresponds to a maximum radial displacement of the image counting disc 401 described in more detail hereinbelow. A set of 14 inner counting marks 411 is arranged on the inner counting mark circle 409; these inner counting marks lie in each case opposite the wedge vertices of the notches 406 and are formed by even numbers from 2 to 26 as well as by the empty frame symbol "→". Likewise a set of 14 outer counting marks 412 is arranged on the outer counting mark circle 410, in each case on or near the teeth 407 between the notches 406, and on account of the restricted space available these are represented simply by identical dotted marks. In this connection these dotted counting marks 412 lying on the outer counting mark circle 410 are in each case situated angularly displaced between two adjacent inner counting marks 411, identified by numbers or by the empty frame symbol, of the inner counting mark circle 409.

The diameter of the image counting disc 401, being the distance between the outer edges of in each case two diametrically opposite teeth 407 of the toothed ring 408, is less than the diameter of the carrier tray 403 of the plate 402, as is evident for example from FIG. 26. This arrangement permits a displacement of the image counting disc 401 together with its lower surface 405 within the carrier tray 403 of the plate along the floor of the said carrier plate 403 in directions perpendicular to a mid axis of the image counting disc.

A first arresting tooth 413 and a second arresting tooth 414 are formed on the circumferential edge of the floor or on the circumferential inner wall, projecting from the said floor, of the circular carrier tray 403. The two arresting teeth 413, 414 are arranged almost diametrically opposite to one another in the illustrated embodiment, in which 14 notches 406 and 14 teeth 407 of the toothed ring 408 are provided, the second arresting tooth 414 being angularly displaced in an anti-clockwise direction from the position of an exactly diametrical arrangement, by half the width of a tooth 407 of the toothed ring 408 of the image counting disc 401. The first and second arresting teeth 413, 414 are in each case formed so that their teeth vertices in each case project radially into the interior of the carrier tray 403 and can engage in the notches 406 between in each case adjacent teeth 407 of the image counting disc 401. In this connection the diameter of the image counting disc 401 is chosen so that at its maximum possible displacement in the direction of one or other of the arresting teeth 413, 414, in each case only one or other of the two arresting teeth 413, 414 can engage in a notch 406 and thus between teeth 407 of the toothed ring 408 of the image counting disc 401, whereas the in each case other arresting tooth lies outside the toothed ring 408 without engaging in one of the notches 406. On the other hand the diameter of the image counting disc 401 is sufficiently large that both arresting teeth 407 cannot be disengaged at the same time from the image counting disc 401. Consequently, during transverse displacements of the image counting disc 401 between the two arresting teeth 413, 414, the latter alternately fully engage with the toothed ring 408 of the image counting disc 401, as is described in more detail hereinafter.

The rear half cover 4 of the camera housing has on its upper surface and at a small distance above the image counting disc 401 a T-shaped inspection window 415 that is of sufficient length in the radial direction of the image counting disc 401 that, depending in each case on the position of the image counting disc 401 within the carrier tray 403 of the plate 402, inner counting marks 411 and outer counting marks 412 of respectively the inner and outer counting marks circle 409, 410 can be visually observed by the camera user through the inspection window 415, alternately either jointly or simply only an inner counting mark 411 of the inner counting mark circle 409. The inspection window 115 thus forms a display device cooperating with the counting marks 411, 412 of the image counting disc 401, the said image counting disc being able to be displaced relative to the display device.

The image counting disc 401 is driven by feeding the film and to this end is kinematically connected to the film feed device or to the film metering means, preferably in such a way that the image counting disc 401 is rigidly coupled to the sprocket wheel 101 of the perforation wheel assembly 100 shown in a simplified manner in FIG. 27, which engages in the edge perforations of the film inserted in the camera. To this end the shaft frustum 113 of the perforation wheel assembly 100 shown in detail in FIGS. 4 and 5 passes through an opening 416 of the carrier tray 103 of the plate 102, the eccentric pin 114 engaging in a central opening 417 of the image counting disc 401, as is clear in particular from FIG. 26. The effective diameter of the opening 416 of the carrier tray 403 is sufficiently large that the eccentric pin 114 of the perforation wheel assembly can move therein during its rotation along a circular path. On the other hand the effective diameter of the central opening 417 of the image counting disc 401 is only slightly larger than the diameter of the eccentric pin 114, so that the latter can rotate during the rotation of the perforation wheel assembly 100 in this central opening 417 of the image counting disc 401, but is forced to entrain the image counting disc 401 in the circular movement of the eccentric pin 114.

Since in the illustrated embodiment the sprocket wheel 101 engaging in the edge perforations of the film is designed as regards its circumference so that in each case it executes a rotation of 180° during feeding of the film by one frame, the shaft frustum 113 of the perforation wheel assembly 100 carrying the eccentric pin 114 and connected to the sprocket wheel 101 in each case also rotates by 180° per frame about its mid axis.

The adjustment of the image counting disc 401 by means of the eccentric pin 114 of the perforation wheel assembly 100 with the cooperation of the arresting teeth 413, 414, is described in more detail hereinafter, and more specifically by way of example in the phases in which, on feeding the film by two successive frames, the image counting disc 401 is moved from the image number 14 through the image number 13 to the image number 12.

FIG. 27(a) shows the state in which the counting mark identified by the number "14" of the image counting disc 401 is visible through the inspection window 415, whereby the user of the camera is informed that the film contained in the camera is in a feed state in which 14 exposures still remain before the film is completely used. In this position of the image counting disc 401 only one counting mark 411 of the inner counting mark circle 409, and no counting mark 412 of the outer counting mark circle 410, is thus visible in the inspection window 415.

If the user of the camera had taken a picture with the number 14 counting backwards on the film, then before taking the next exposure the user of the camera actuates the film feed wheel 9 in order to feed the film to the position to take an exposure with the number 13, counting backwards, the image counting disc 401 being moved to a position to display the counting mark associated with this image number. This is achieved in the following way.

During the feed of the film from the position to take the picture numbered 14 counting backwards by one frame to the position to take a picture numbered 13 counting backwards, the sprocket wheel 101 together with the shaft frustum 113 and the eccentric pin 114 arranged on the front face thereof rotate by 180° in an anti-clockwise direction according to the successive representations shown in FIGS. 27(a) to 27(d). The image counting disc 401, which in the position according to FIG. 27(a) is engaged with the first arresting tooth 413 but is free from the opposite second arresting tooth 414, is displaced in the partial step going from FIG. 27(a) to FIG. 27(b) in a clockwise direction from the eccentric pin 114 on account of the locking and supporting action of the first arresting tooth 413, in a displacement movement to the right and upwards and in a superimposed rotational movement by a small angular amount, the said rotational movement arising from the fact that the image counting disc 401 is swivelled in a clockwise direction by the eccentric pin 114 about a support point formed by the first arresting tooth 413.

In this disc and swiveling movement the first arresting tooth 413 gradually releases the notch 406 lying close to the counting mark "14", in which it first of all engaged, and the second arresting tooth 414 gradually comes into engagement with the notch close to the roughly diametrically opposite counting mark numbered "26".

This procedure continues in the transition from the position according to FIG. 27(b) to the position according to FIG. 27(c), the image counting disc 401 being further displaced upwardly from the eccentric pin 114 executing a circular path of 180°, with the result that on the one hand the first arresting tooth 413 completely releases the notch close to the counting mark "14" and on the other hand the second arresting tooth 414 engages deeper in the notch close to the counting mark "26". This procedure involving the transfer of the image counting disc 401 from the first arresting tooth 413 to the second arresting tooth 414 corresponding to a film feed by one frame is completed when the aforedescribed 180° rotation of the perforation wheel assembly 100 is completed and the image counting disc 401 is thereby rotated so far in the clockwise direction and displaced upwardly by the eccentric pin 114 that the image counting disc 401 has reached the position according to FIG. 27(d). The first arresting tooth is then situated opposite that tooth 407 of the toothed ring 408 of the image counting disc 401 that is positioned angularly between the counting marks "14" and "12", while the second arresting tooth 414 has fully engaged in the notch close to the counting mark "26". The resulting displacement movement that the image counting disc 401 executes in the transition from the position according to FIG. 27(a) to the position according to FIG. 27(d) corresponds to the value, defined in length units, of the maximum possible displacement of the image counting disc 401.

In the position of the image counting disc 401 according to FIG. 27(d), both the two counting marks "14" and "12" of the inner counting mark circle as well as the dotted counting marks of the outer counting mark circle situated angularly between these two counting marks are all visible in the inspection window 415. This display in the inspection window 415 indicates to the observer that the counting mark point situated angularly between the two counting marks "14" and "12" and recognisable in the inspection window 415 marks the counting state "13" and thus the exposure number "13". The observer is thereby notified that a further 13 exposures still remain, and the film is wound ready in a position to take the photograph numbered 13 counting backwards.

If after taking a photograph with the number 13 counting backwards the film is wound on by one further frame from the position in which a photograph with the number 13 counting backwards was taken to the position to take a photograph with the number 12 counting backwards, the sprocket wheel 101 engaging in the film perforations thus rotates together with the shaft frustum 113 by a further 180°, whereupon the eccentric pin 114 completes a further circular movement by 180° in the clockwise direction according to the sequence shown in FIGS. 27(d) to 27(h).

The image counting disc 401, which in the position according to FIG. 27(d) is in engagement with the second arresting tooth 414 but is free from the oppositely situated first arresting tooth 413, thereby undergoes a displacement movement to the left and downwards, corresponding to the partial step from FIG. 27(d) to FIG. 27(e), from the eccentric pin 114 on account of the locking and supporting action of the second arresting tooth 414, and in a superimposed rotational movement is displaced in a clockwise direction by a small angular amount, the said rotational movement occurring on account of the fact that the counting mark disc 401 is swivelled in an anti-clockwise direction by the eccentric pin 114 about a supporting point formed by the vertex of the second arresting tooth 414.

In this disc and swivelling movement of the image counting disc 401 the second arresting tooth 414 gradually releases the notch lying close to the counting mark "26", in which it engaged, and the first arresting tooth 413 gradually engages again with the image counting disc 401, but now with the notch close to the counting mark "12".

This procedure involved in the transition from the position according to FIG. 27(e) to the positions according to FIGS. 27(f) and 27(g) continues, the image counting disc 401 being displaced further downwardly from the eccentric pin 114, with the result that on the one hand the second arresting tooth 414 completely releases the notch close to the counting mark "26", and on the other hand the first arresting tooth 413 engages deeper in the notch close to the counting mark "12". This procedure involving the transfer of the image counting disc 401 from the second arresting tooth 414 to the first arresting tooth 413 corresponding to a film feed by again one frame is completed when the perforation wheel assembly 100 has completed the aforementioned further rotation by 180° and the image counting disc 401 is rotated so far in the clockwise direction and displaced downwardly by the eccentric pin 114, that the image counting disc 401 has reached the position according to FIG. 27(h). The second arresting tooth 414 then lies opposite that tooth 407 of the toothed ring 408 of the image counting disc 401 that is located angularly between the counting marks "26" and "24", whereas the first arresting tooth 413 has engaged fully in the notch close to the counting mark "12".

In this position of the image counting disc 401 only the counting mark "12" of the inner counting mark circle 409 is visible in the inspection window 415. The observer is thus notified that a further 12 photographs can be taken and the film is wound ready in a position to take the photograph numbered 12 counting backwards.

The aforedescribed switching procedure from the display of the counting mark "14" up to the display of the dotted counting mark located angularly between the counting marks "14" and "12", and which is associated with the photograph number "13" corresponding to a film feed by one frame as well as the next following switching procedure from the display of this counting mark up to the display of the counting mark "12" corresponding to a film feed by one further frame, have similarly also already taken place in the preceding film feed procedures, not described in more detail above, by in each case two successive frames, and are repeated in the following film feed procedures by in each case two further successive frames, until the last of the available exposures on the film has been taken and the empty frame symbol "→" of the inner counting mark circle 409 appears in the inspection window 115.

In this adjustment position the image counting disc 401 can be prevented from rotating further during continued feed of the film, for which purpose either a friction coupling (not shown in more detail) or a spring travel path may be provided in the force transmission path between the sprocket wheel 101 and the image counting disc 401, as is also explained in more detail hereinbelow in the course of the description of a further embodiment.

During the film feed by in each case two successive frames the image counting disc 401 accordingly in each case executes a gyratory movement consisting of a single backwards-and-forwards movement between the arresting teeth 413, 414 and a superimposed rotational movement equal to the angular width of a tooth 407 of the toothed ring 408 of the image counting disc 401, as a result of which during the film feed by in each case successive frames in the repeating gyratory movement of the image counting disc 401, the counting marks successively appear under the inspection window 115 in the manner described above. In the illustrated embodiment the rotation of the image counting disc 401 resulting from the gyratory movements occurs in the opposite direction to the rotation of the sprocket wheel 101.

As has already been mentioned above, each time after a photograph has been taken on the film the sprocket wheel 101 that engages with the edge perforations of the film and is caused to rotate by one frame during the feeding of the film executes a rotational movement of 180°, whereby the image counting disc 401 rigidly coupled to the sprocket wheel 101 is rotated by an angular amount of ca. 12.9° about its mid point in the arrangement described above, so as to display a total of 28 counting marks comprising a total of 27 exposures plus one additional empty frame with each film feeding step. A reduction ratio of ca. 14:1 between the sprocket wheel 101 and the image counting disc 401 is thereby achieved.

The aforedescribed image counting device 400 accordingly manages to operate without a pawl drive between the sprocket wheel 101 and image counting disc 401. Despite the positive engagement between the sprocket wheel 101 and image counting disc 401, there is also no need to provide a toothed wheel or belt-type reduction gearing between the sprocket wheel 101 and the image counting disc 401. Furthermore the counting device 400 according to the invention has the advantage of an extremely flat and therefore extremely space-saving design and construction and can be installed using a simple plug-in technique, which also favours an automated installation of the image counting device and the other components of the camera cooperating therewith.

If the camera, in a departure from the embodiment described above, is designed so that the maximum number of photographs that can be taken (including one or more empty frames) per film is greater than or less than 28 counting objects, the number of notches 406 and teeth 407 lying therebetween of the toothed ring 408 of the image counting disc 401 that are to be provided on the said image counting disc 401 must be matched so that the number of these notches 406 and teeth 407 lying therebetween corresponds in each case to half this maximum number of counting objects. The reduction ratio involved in the rotation of the image counting disc 401 is thereby also correspondingly changed depending on the rotation of the sprocket wheel 101.

With an image counting device for counting a number of exposures differing from the maximum number of 28 exposures (including empty frames) and in a corresponding matching of the number of notches 406 and teeth 407 on the image counting disc 401, it may also happen that the two arresting teeth 413, 414 are arranged exactly diametrically opposite one another and/or with complete engagement of one of the two arresting teeth 413, 414 in a notch 406 of the image counting disc 401 the in each case other arresting tooth is not situated opposite a tooth of the toothed ring but instead opposite a notch of the image counting disc 401, without however in this switching state engaging in this notch.

These adaptations also apply as appropriate to the embodiments described hereinafter.

Whereas in the embodiment according to FIGS. 25 to 27 the notches 406 together with the teeth 407 formed therebetween are arranged in the plane of the counting marks on the image counting disc 401, according to further embodiments that are illustrated in FIGS. 28 to 31 the arrangement may also be such that only the inner and outer counting marks lying on the two counting mark circles 409, 410 are arranged on the upwardly directed surface 404 of the image counting disc 401, whereas the notches 406 together with the teeth 407 of the toothed ring 408 formed therebetween are provided only on the lower surface 405 of the image counting disc 401. This has the advantage that the upper surface 404 of the image counting disc 401, sections of which are in each case visible through the inspection window 115, forms an enclosed circular area with a smooth circumferential edge and the notches 406 arranged on the lower surface 405 of the image counting disc 401 are thereby obscured and are not visible through the inspection window 115 when the image counting disc 401 is displaced, which contributes to the clarity of the representation of the counting marks when observed in the inspection window 115 by the user of the camera. In this connection the arresting teeth 413, 414 engaging alternately in the notches 406 are arranged so deeply within the carrier tray 403 that an upper layer of the image counting disc 401, forming the upper surface 404, can slide over and off the arresting teeth 413, 414.

Instead of two arresting teeth 413, 414 according to the embodiment described above, three or more arresting teeth may also be provided on the circumference of the carrier tray 403 for cooperation with the toothed ring 408 of the image counting disc 401.

It is also possible, instead of the arresting teeth 413, 414 and the notches 406 of the image counting disc 401 cooperating therewith, to provide differently formed catch or arresting devices which alternately retain the image counting disc 401 on roughly opposite facing catch or arresting points in such a way that on the rotation of the perforation wheel assembly 100, a rotation of the image counting disc 401 takes place alternately about these catch or arresting points in a similar manner to the embodiment described with the aid of FIGS. 25 to 27, in which a rotation of the image counting disc 401 takes place alternately about one or other of the arresting teeth 413, 414.

For example, according to a further embodiment of the invention the second arresting tooth 414 can be replaced by a clamping device acting in a direction parallel to the axis of rotation of the sprocket wheel 101, which clamping device according to FIGS. 30 and 31 has a one-arm spring lever 420 secured to a housing part of the core assembly 2 and a spherical cap 421 provided on its free end, which cap is forced under the action of a spring-type pretensioning of the spring lever 420 against the upper surface 404 of the image counting disc 401. The image counting disc 401 can be frictionally displaced and rotated underneath the impact point of the spherical cap 421 in the same way as is shown in detail in FIGS. 27(a) to 27(h). As a departure therefrom the clamping device 420, 421 may also be formed by catch means.

A further embodiment of the image counting device according to the invention is illustrated in FIGS. 32 to 34. In this embodiment the image counting disc 401 is subdivided into an outer ring region 422 and an inner ring region 423. The outer ring region 422 has notches 406 and teeth 407 of the toothed ring 408 and also inner and outer counting marks corresponding to FIGS. 25 to 28. The central opening 417 of the image counting disc 401 is located in the inner ring region 423. The outer and inner ring regions 422, 423 are connected to one another by for example three elastic connecting members 424, 425, 426, in which connection the two ring regions 422, 423 and the elastic connecting members 424, 425, 426 may be formed as a single integral unit from plastics material.

The elastic connecting members 424, 425, 426 have the effect that, after the maximum possible number of photographs have been taken, the image counting disc 401 after reaching a corresponding end position can be prevented by means of a counting disc locking device from executing further rotation, even though in the subsequent rewinding of the end strip into the film cassette provided in the camera, the sprocket wheel 101 is rotated further by the film and thus the eccentric pin 114 also rotates further. Its movement and a rotating movement of the inner ring region of the image counting disc 401 that is thereby produced is absorbed by a corresponding deformation of the elastic connecting members 424, 425, 426 and is therefore not transmitted to the outer ring region of the image counting disc 401.

The counting disc locking device and its mode of action are described in more detail hereinafter.

The image counting disc 401 has on its lower surface 405 an axially projecting stop means 427. In addition the counting disc locking device includes a locking lever 428 with a terminally situated pawl 429 and an oblong hole 430 in which engages a bearing pin 431 integral with the housing, with the result that the locking lever 428 can rotate about the bearing pin 431 under the action of a tension spring 432 engaging the other end of the locking lever 428, and can execute a certain degree of longitudinal displacement on account of the oblong hole 430.

In the previously adjusted starting position of the image counting disc 401 according to FIG. 32, in which the "Start" and "End" symbol "→" is displayed in the inspection window 115, the locking lever 428 together with its pawl 429 bears radially against the stop means 427 of the image counting disc 401, without however preventing the latter rotating. If the user of the camera then actuates the film feed wheel 9 to effect exposure-to-exposure feed of the film, the image counting disc 401 thus rotates in a clockwise direction during the film feeding procedure by in each case two successive frames in in each case successive movement phases according to FIG. 27(a) to FIG. 27(h), as is indicated in FIGS. 32 to 34 by an arrow A located next to the image counting disc 401. In this connection the elastic connecting members 424, 425, 426 are just sufficiently stiff so that in these movement phases there is no relative movement between the inner ring region 421 and outer ring region 420 of the image counting disc 401.

Shortly after the image counting disc 401 has left the "Start" position, the locking lever 428 together with its pawl 429 slides from the stop means 427 of the image counting disc 401 and rotates slightly about its bearing pin 431 in a clockwise direction until it comes to rest against a pin 433 integral with the housing. This can be seen in FIG. 33, in which the film feed has already progressed so far that the image counting disc 401 adopts for example a position in which it displays the exposure number "14". If after further film feeding steps the last exposure from the maximum possible number of exposures has been taken, the image counting disc 401 reaches the "End" position according to FIG. 34, in which the stop means 427 of the image counting disc 401 comes to rest against the pawl 429 of the locking lever 428 and thereby blocks any further rotation of the image counting disc 401 as soon as the locking lever 428 has been entrained by the image counting disc 401 along the length of the oblong hole 430. In this position of the image counting disc 401 the first arresting tooth 413 engages in the toothed ring 408 of the image counting disc 401, while the "→" symbol visible through the inspection window 415 indicates that the end strip of the film can now also be wound into the film cassette contained in the camera by repeated actuation of the film feed wheel 9. The rotating movement transmitted from the eccentric pin 114 to the inner ring region 423 of the image counting disc 401 cannot be transmitted to the outer ring region 422 of the image counting disc 401 as a result of the arrest of the latter, the relative movements occurring between the inner ring region 423 and the outer ring region 422 of the image counting disc being compensated by a pulsing movement of the elastic connecting members 424, 425, 426.

A further embodiment of an image counting device is described in more detail hereinafter with the aid of FIGS. 35 to 43. This device comprises in addition a further control device described in more detail below, by means of which after taking a last photograph on a film inserted in the camera, the locking lever 201 of the feed locking device 200 of the camera can be disengaged, so that an end strip of the film following after the film section containing the last exposure can be wound in one go onto the film cassette inserted into the camera. For the sake of clarity, the second lever arm 313 together with its associated parts is omitted in FIGS. 36 to 43 in the illustration of the release lever 301 of the shutter release device 300 described above, although this second lever arm 313 together with its associated parts is also present in this embodiment.

In this embodiment according to FIGS. 35 to 43 the image counting disc 401 is, as regards the arrangement of the teeth 407 of the toothed ring 408 on the underside 405 of the image counting disc 401, formed substantially corresponding to the embodiment according to FIGS. 28 and 29, though it differs from the latter in that in the direction of rotation of the image counting disc 401, after the counting mark for the exposure number 27 three successive "→" symbols are provided on the inner counting mark circle 409 to indicate an end strip of the film, and a "E" symbol is provided to indicate the end of the film, i.e. to indicate the end of the feed of the end strip of the film. The division of the toothed ring 408 is matched corresponding to the additional inclusion of these symbols in the circle of the counting marks on the inner counting mark circle 409, i.e. the number of notches 406 was appropriately increased with a corresponding reduction in their mutual interspacing. Furthermore there is a series of empty frame symbols "→" on the outer counting mark circle 410 between the counting mark for the exposure numbered "27" and the counting mark for the exposure numbered "1".

The locking lever 201 of the feed locking device 200 is controlled by the image counting disc 401 in such a way that on rotation of the perforation wheel assembly 100 the lever is prevented from engaging in the grooves 111, 112 of the grooved disc and is thus rendered inoperative if and until on feeding the film by the length of its end strip by continued actuation of the film feed wheel 9, the display symbols "→" and "E", which follow the counting mark indicating the exposure number 1, appear in the inspection window 415.

The image counting disc 401 includes for this purpose the aforementioned control or blocking device, which in the illustrated embodiment is formed so that a longitudinally extending arcuate control or blocking stop 440 is arranged on the underside 405 of the counting disc 401 along an inner control circle, and four wedge-shaped control or blocking stops 441, 442, 443, 444 having the same mutual interspacing, are arranged on an outer control circle. These control stops 440, 441, 442, 443, 444 are in each case shown cross-hatched for better recognition in FIGS. 35 to 45. The two aforementioned control circles are concentric with the mid point of the image counting disc 401. The mutual interspacing of these two control circles is exactly the same size as the mutual interspacing of the inner counting mark circle 409 and the outer counting mark circle 410 on the image counting disc 401. As FIG. 37 and following figures show, the aforementioned control stops 440, 441, 442, 443, 444 in each case project in an axial direction downwardly from the underside 405 of the image counting disc 401 and are therefore not visible from above to the observer. The length of the arcuate control stop 440 and the number of wedge-shaped control stops 441, 442, 443, 444 correspond to the length of the end strip of the film. The longer the end strip, the longer the arcuate control stop 440 and therefore the larger the number of wedge-shaped control stops 441, 442, 443, 444.

Furthermore in the embodiment according to FIGS. 35 to 43 the locking lever 201 comprises in the vicinity of its first locking pawl 405 a bolt 210 projecting upwardly and parallel to the axis of rotation 203 of the locking lever, the free end of which bolt can on rotation of the locking lever 201 in a clockwise direction about the axis of rotation 202 alternately come into contact with in each case one of the control stops 440, 441, 442, 443, 444 of the image counting disc 401.

FIGS. 36 and 37 show the functional state in which the camera is ready to take the last photograph, i.e. the photograph with the exposure number 1. Accordingly the locking lever 201 is in the locking position, i.e. is in engagement with the knurled section of the film feed wheel 9 and in engagement with one of the grooves 111, 112 of the grooved disc 110 of the perforation wheel assembly 100, while the counting mark numbered "1" is displayed in the inspection window 415. In order to take the photograph numbered "1" the release membrane 312 is actuated, whereupon the switching member 320 of the third lever arm 319 of the release lever 301 swivels the locking lever 201 about its axis 203 in an anti-clockwise direction, so that it reaches the position according to FIGS. 38 and 39. In this way the film feed wheel 9 and the grooved disc 110 of the perforation wheel assembly 100 are released once more from the locking lever 201.

If the user of the camera now continues to turn the film feed wheel 9, then after one revolution of the sprocket wheel 101 by 180° the image counting disc 401 reaches the position according to FIGS. 40 and 41, in which the first of the empty frame symbols "→" following the counting mark "1" is displayed in the inspection window 415 and on account of the rotational and displacement movement of the image counting disc 401 according to FIGS. 27(a) to 27(d) the first of the stops 441, 442, 443, 444 of the outer control circle is now located opposite the bolt 210 of the locking lever 201, as is shown in FIGS. 40 and 41. The image counting disc 401 has thus adopted a position in which it is released from the first arresting tooth 413 and engaged by the second arresting tooth 414. On account of the blocking action of the aforementioned control stop 441 of the image counting disc 401 the locking lever 201 cannot engage in the available groove 111 or 112 of the grooved disc 110 despite the action of the spring tension that has built up in the third lever arm 208 of the locking lever 201, with the result that a locking of the film feed wheel 9 of the film feed device by the locking lever 201 does not occur.

Accordingly the user of the camera can, corresponding to the information that he receives via the display symbol "→" in the inspection window 415, continue to operate the film feed wheel 9 and thus continue the film feed procedure, whereby the end strip of the film traverses the exposure unit in the camera. When the sprocket wheel 101 driven by the film has completed a further rotation of 180°, the image counting disc 401 in its rotational and displacement movement according to FIGS. 27(e) to 27(h) has reached the position according to FIG. 27(h) or 27(a), in which it is released once more from the second arresting tooth 414 but is engaged once more by the first arresting tooth 413. In this connection, although the first control stop 441 of the outer control circle of the image counting disc 401 has released the bolt 210 of the locking lever 201, so that the said bolt 210 was able to engage in the gap between the first control stop 441 and the second control stop 442 of the outer control circle of the image counting disc 401, it now however strikes the arcuate inner control stop 440 of the image counting disc 401, as illustrated in FIGS. 42 and 43. On account of the transverse displacement of the image counting disc 401 that takes place, the locking lever 201 adopts the same angular position in relation to its axis of rotation 403 that it already had in the preceding phase of the sequence of operations, when it rested against the first control stop 441 of the outer control circle. The locking lever 201 is thus once more prevented from engaging in a newly available groove of the grooves 111, 112 of the grooved disc 110 and thereby locking the film feed wheel 9. The film feed thus continues to remain unlocked, and the first and second of the display symbols "→" of the outer counting mark circle 409 of the image counting disc 401 are simultaneously visible in the inspection window 415.

Since the film feed device remains unlocked the user of the camera can continue to actuate the film feed wheel 9 unhindered, the aforementioned procedures being in principle repeated, though with the proviso that now successively the second control stop 442, the third control stop 443 and the fourth control stop 444 of the outer control circle of the image counting disc 401, and in the same way as previously the first control stop 441 of this outer control circle, will stand opposite the bolt 210 of the first locking pawl 205 of the locking lever 201, and at intervals the bolt 210 of the locking lever 201 will appear in each case at other regions of the longitudinally extending inner control stop 440 of the image counting disc 401. At the end of these repeating procedures the "End" symbol "E" of the image counting disc 401 appears in the inspection window 415, which informs the user that the film feed has been completed and also that the end strip of the film has been fully wound onto the film cassette (not shown) arranged in the camera.

The camera, which is preferably designed for one-off use, can now be given by the user to a film developing and copying service, where the film cassette together with the exposed film is removed from the camera and the exposed film contained therein can be processed by the developing and copying service in accordance with the user's instructions, while the camera is disposed of or sent for recycling.

The outer control stops 441, 442, 443 and 444 as well as the inner arcuate control stop 440 on the underside 405 of the image counting disc 401 thus constitute a control device that serves to render the locking lever 201 of the feed locking device 200 of the camera inoperable during the rotation of the image counting disc 401 within certain angular ranges, so that the film feed wheel 9 of the film feed device of the camera remains permanently unlocked while feeding the end strip of the film through the exposure unit of the camera. This control device results from the image counting disc 401 and has on account of the gyratory reciprocating movement of the image counting disc 401 along the floor of the carrier tray 403, two control regions 440 and 441, 442, 443, 444 that are displaced relative to one another in a radial direction corresponding to this reciprocatory movement of the image counting disc 401 and come into operation alternately in conformity with this reciprocatory movement.

In the image counting device 400 described above the counting marks may also be arranged on the image counting disc 401 so that, instead of an image counting in decreasing numerical order, image counting takes place in increasing numerical order.

Since in the last described embodiment the image counting disc 401 is not arrested at the end of a whole counting procedure, after a counting has been carried out in a certain sequence a smooth changeover may be made to a counting sequence in reverse order, which may be advantageous when winding a film in the camera backwards or forwards for editing purposes before starting the frame-by-frame exposure or after completion of the frame-by-frame exposure of the film.

If as a departure from the illustrated embodiments odd numbers are provided as external counting marks instead of the dotted external counting marks of the external counting mark circle 410, the inspection window 415 can then be in the form of a radially extending rectangle or a circle, without the necessity for a transverse extension of the inspection window 415 corresponding to the horizontal bar of the T-shape shown in the drawings.

The image counting device described above can also be used if the sprocket wheel 101 is designed so that it is rotated not by 180° but instead by 360° when feeding the film by in each case one frame. The image counting disc 401 thereby passes through all movement phases according to FIGS. 27(a) to 27(h) successively and sequentially during a feeding of the film by one frame, to which end in this case all image marks on the image counting disc 401 are arranged at such a mutual interspacing on a single image mark circle that, starting from the display of an image mark characterising a certain exposure number in the inspection window 415 when setting the image counting disc 401 according to FIG. 27(a), the image mark indicating the exposure with the next following image number (counting backwards) is then displayed in the inspection window 415 when the image counting disc 401 has reached its setting according to FIG. 27(h). In this case too the inspection window 415 may be reduced to a simple rectangular or circular shape. Furthermore, in this embodiment only a single arcuate control stop 440 instead of several control stops 440 to 444 need be provided in order to form a stop for the bolt 210 of the locking lever 201 of the feed locking device 200 when feeding the film incrementally in the region of the end strip and to prevent the locking lever 201 engaging in one of the grooves 111, 112, of the grooved disc 110 of the perforation wheel assembly 100.

Finally, it is also possible that in the image counting device 400 the image counting disc 401 carrying the counting marks is not displaced relative to the inspection window 415, but instead the image counting disc carrying the counting marks may, in kinematic reversal, be stationary and a carrier containing the inspection window 415 may rotate about this image counting disc during incremental feeding of the film, the inspection window then moving over the counting marks of the stationary image counting disc. In this case the perforation wheel assembly 100 does not drive the image counting disc, but instead drives the carrier of the inspection window 415. Furthermore, deviations from the embodiments illustrated in the drawings are also possible inasmuch as, instead of an eccentric pin 114 on the shaft 113 of the perforation wheel assembly 100, an eccentric is formed by the image counting disc 401.

The image counting device described above may also be employed in other photographic apparatus and equipment or other types of recording equipment involving the counting of images or other types of recordings.

Furthermore, the counting device used for counting images in a camera in the embodiment described above may also be used in other equipment, apparatus and machinery to count successive switching, control or other procedures within a limited counting range, for example in devices for the automatic monitoring of access to vehicles and other means of transport, meeting venues, etc., or in devices for packing or selling receptacles containing objects or substances in limited numbers or amounts in each case, above all in those cases in which in non-stationary use of such devices, counting procedures are to be carried out using simple mechanical means, independently of the availability of external energy sources. In this connection switching members other than the locking lever 201 provided in the embodiment according to FIGS. 36 to 43 may be controlled depending on predetermined angular positions of the counting disc.

The above embodiments of an image counting device for a camera are examples of the embodiment of a more general teaching. According to this teaching, in a counting device for a camera or for other applications with a counting mark carrier 401 with a plurality of angularly arranged counting marks forming a first assembly and with a display device 415 forming a second assembly and cooperating with counting marks of the counting mark carrier, with relative adjustability of the two assemblies with respect to one another by means of a control device 114, the assembly 401 that can be adjusted relative to the other assembly can be rotated and displaced by the control device 114 parallel to a plane of rotation of this adjustable assembly 401. Preferably the rotatable and displaceable assembly contains the counting mark carrier 401.

The adjustable assembly 401 may be arrested alternately at different regions of its edge and may be rotated alternately about these arresting regions by means of the control device. In particular, the adjustable assembly 401 may have an annular external contour and may form an arresting device consisting of at least two arresting means 413, 414 and/or 420, 421 engaging at different points on the annular external contour, between which means the adjustable assembly 401 can be displaced parallel to its plane of adjustment so as to be alternately arrested. The arresting means of the arresting device may alternately arrest the adjustable assembly 401. The arresting means may comprise at least one arresting tooth 413 and the adjustable assembly 401 may have a toothed ring 408 on its annular external contour, by means of which at least one arresting tooth 413 can alternately come into and out of engagements.

For example the adjustable assembly 401 may have an inspection surface 404 and a surface 405 opposite this inspection surface, on which the toothed ring 408 is arranged, the said ring being covered by the inspection surface 404. The arresting device may comprise a further arresting tooth 414 which, in relation to the adjustable assembly 401, lies almost diametrically opposite the first arresting tooth 413. In another modification the arresting device may comprise a clamping device 420, 421 by means of which the adjustable assembly can be arrested by clamping.

The adjustable assembly can be driven by the control device 114 and rotated and displaced under the action of the arresting device. The control device 114 may together with the adjustable assembly form an eccentric. The adjustable assembly may be disc-shaped.

In a further modification the adjustable assembly 401 may have two regions 422, 423 movable with respect to one another, the arresting device acting on one region 422 and the control device 414 acting on the other region 423, the two regions being able to be frictionally connected to one another. One or more elastically deformable connecting members 424, 425, 426 may be provided between the two regions 422, 423 of the adjustable assembly 401.

In yet a further modification the adjustable assembly 401 may be blocked in a predetermined position by a locking device 428–433. In a further modification the adjustable assembly 401 may have stop means 440–444 that cooperate with a switching device 210 in predetermined positions of the adjustable assembly.

Preferably counting marks 411, 412 may be arranged in a predetermined numerical sequence alternately on two concentric circles 409, 410 on the assembly 401 containing the counting mark carrier. The display device 415 may be formed by a window cooperating with counting marks of the counting mark carrier, the said window being designed and arranged in such a way that it displays counting marks of both concentric circles 409, 410. The window of the display device 415 may be formed in such a way that at least in one arresting position of the counting mark carrier 401 it extends in a radial direction over both concentric circles on which counting marks are arranged. In particular the window of the display device 415 may be approximately T-shaped.

By way of example, the counting mark carrier 401 forms the image counting disc of a camera. In a camera with an image counting device of the above type, the adjustable image counting disc 401 may have a control device 440–444 for controlling a feed locking device 200 of the camera, wherein the control device 440–444 renders the feed locking device 200 inoperative in predetermined positions of the image counting disc. The control device 440–444 of the image counting disc 401 may have at least two groups of stop means 440 and 441–444, which are alternately activated corresponding to adjustment movements of the image counting disc 401. The groups of stop means 440 and 441–444 may form concentric rings and may be arranged in such a way that stop means 441–444 that are arranged on an outer circular arc have such a mutual interspacing that a switching member 210 of the feed locking device 200 or of another switching device can by relative adjustment between adjacent stop means reach a further stop means 440 arranged along a concentric inner circular arc.

What is claimed is:

1. A camera comprising film feed (9) operable for feeding a light-sensitive film arranged in the camera; shutter actuating means (300) for actuating a photographic shutter (10) of the camera for image-forming exposure of the film, operable between a readiness position and an actuating position; feed locking means (200) comprising engaging means (206, 207) movable between a first position in which the engaging means does not engage the film feed (9), and a second position in which the engaging means engages the film feed so as to lock the film feed means against operation; spring means (208) connected to the feed locking means (200) and being in an detensioned condition when the engaging means (206,207) of the feed locking means (200) is in the second position and when the engaging means is being moved to the first position; and control means (104, 106) movable in accordance with film feeding, for controlling the spring means (208) so as to be increasingly tensioned during a step of film feeding according to the length of an image frame; wherein the engaging means (206, 207) of the feed locking means (200) is moved by the spring means (208) from the first position to the second position at the end of the step of film feeding according to the length of the image frame, and is moved from the second position back to the first position by the shutter actuating means (300) when operated after the step of film feeding.

2. A camera according to claim 1, wherein the control means (104,106) is locked by the feed locking means (200) when the engaging means (206,207) is in the second position.

3. A camera according to claim 1, wherein the spring means (208) is tensioned by the control means (104, 106) to a maximum shortly before the step of film feeding according to the length of the image frame has been completed and shortly before the engaging means (206, 207) of the feed locking means (200) adopts the second position for locking the film feed means (9).

4. A camera according to claim 1, wherein the spring means (208) comprises a resilient member of plastic material.

5. A camera according to claim 4, wherein the resilient member is a resilient lever.

6. A camera according to claim 1, wherein the spring means (208) is tensioned by the control means (104, 106) via the shutter actuating means (300) when returned from the actuating position to the readiness position by the control means.

7. A camera according to claim 6, wherein the control means (104, 106) comprises at least one cam surface (107, 108) arranged for rotation in accordance with feed of the film, and a cam follower (321) connected to a spring means actuating member (320) for contacting the spring means (208).

8. A camera according to claim 7, wherein the spring means actuating member (320) is connected to a release lever (301) of the shutter actuating means (300).

9. A camera according to claim 8, wherein the release lever (301) of the shutter actuating means (300) comprises the cam follower (321).

10. A camera according to claim 8, wherein the spring means actuating member (320) of the release lever (301) of the shutter actuating means (300) converts the feed locking means (200) from a locking position to a non-locking position.

11. A camera according to claim 1, wherein the feed locking means (200) has a locking lever (201) including the spring means (208) formed by a resilient lever arm of the locking lever.

12. A camera according to claim 11, wherein the resilient lever arm forming the spring means (208) together with a further lever arm (209) of the locking lever forms a fork in which the spring means actuating member (320) of a release lever (301) of the shutter actuating means (300) engages, the spring means actuating member (320) acting via the further lever arm (209) of the locking lever (201) to convert the feed locking means (200) from a locking position to a non-locking position and to tension the spring means (208) during subsequent film feed.

13. A camera according to claim 11, wherein the feed locking means (200) is controlled by a further control means (110) connected to the control means (104, 106) acting to tension the spring means (208) of the feed locking means (200).

14. A camera according to claim 13, wherein the feed locking means (200) is alternately controlled by the control means (104, 06) and by the further control means (110).

15. A camera according to claim 14, wherein the control means (104,106) and the further control means (110) together form a structural unit.

16. A camera according to claim 15, wherein the control means (104,106) and the further control means (110) are arranged on a sprocket wheel assembly (100) comprising a sprocket wheel (101) of the camera.

17. A camera according to claim 13, wherein the locking lever (201) of the feed locking means (200) includes a pawl (205) for engagement in a groove (111, 112) of the further control means (110) formed as a grooved disc.

18. A camera according to claim 13, wherein the locking lever (201) comprises the engaging means (206, 207) of the feed locking means (200), the engaging means (206, 207) comprising a locking pawl (206) for engaging in a toothed section of the film feed (9).

19. A camera according to claim 13, wherein the feed locking means (200) is controlled by a locking arrangement (210, 440–444) for rendering the feed locking means (200) inoperative in at least one predetermined counting position of an image counting means (400) of the camera.

20. A camera according to claim 19, wherein the locking arrangement (210,440–444) includes a stop member (210) forming part of the feed locking means (200) and resting against stops (440,441,442,443,444) of an image counting disc (401) of the image counting means (400).

21. A camera according to claim 12, wherein the locking lever (201) of the feed locking means (200) together with the spring means (208), actuating means (206, 207), fork-forming lever (209), pawl (205 and stop member (210) are formed as a single integral unit made of plastic material.

22. A camera according to claim 12, wherein the locking lever (201) of the feed locking means (200) is rotatably mounted on a bearing shaft (202) secured to a lens carrier (117) of the camera.

* * * * *